(12) United States Patent
Cheng et al.

(10) Patent No.: US 11,705,761 B2
(45) Date of Patent: Jul. 18, 2023

(54) WIRELESS CHARGING TRANSMIT END, METHOD, AND SYSTEM

(71) Applicant: Huawei Digital Power Technologies Co., Ltd., Shenzhen (CN)

(72) Inventors: Yuan Cheng, Dongguan (CN); Zhiwei Leng, Dongguan (CN); Haijun Qin, Xi'an (CN)

(73) Assignee: Huawei Digital Power Technologies Co., Ltd., Shenzhen (CN)

(*) Notice: Subject to any disclaimer, the term of this patent is extended or adjusted under 35 U.S.C. 154(b) by 0 days.

(21) Appl. No.: 17/716,846

(22) Filed: Apr. 8, 2022

(65) Prior Publication Data
US 2022/0329108 A1 Oct. 13, 2022

(30) Foreign Application Priority Data
Apr. 9, 2021 (CN) .......................... 202110384215.8

(51) Int. Cl.
*H02J 50/20* (2016.01)
*H02J 50/40* (2016.01)
*H01Q 15/24* (2006.01)
*H04B 1/44* (2006.01)

(52) U.S. Cl.
CPC ............. *H02J 50/20* (2016.02); *H01Q 15/24* (2013.01); *H02J 50/402* (2020.01); *H04B 1/44* (2013.01)

(58) Field of Classification Search
None
See application file for complete search history.

(56) References Cited

U.S. PATENT DOCUMENTS

| 10,447,094 | B2 | 10/2019 | Ku et al. |
| 2007/0298846 | A1 | 12/2007 | Greene et al. |
| 2012/0287978 | A1* | 11/2012 | O'Keeffe ............. H01Q 21/245 375/295 |
| 2013/0115886 | A1 | 5/2013 | Khan et al. |
| 2013/0343235 | A1 | 12/2013 | Khan |
| 2016/0099610 | A1* | 4/2016 | Leabman ............ H02J 7/00045 307/104 |
| 2016/0365754 | A1* | 12/2016 | Zeine ................... H04B 7/0613 |
| 2017/0338698 | A1 | 11/2017 | Zeine et al. |
| 2020/0144865 | A1 | 5/2020 | Vilenskiy et al. |

FOREIGN PATENT DOCUMENTS

CN        109845065 A    6/2019

* cited by examiner

*Primary Examiner* — Jared Fureman
*Assistant Examiner* — Joel Barnett
(74) *Attorney, Agent, or Firm* — Leydig, Voit & Mayer, Ltd.

(57) ABSTRACT

A wireless charging transmit end includes a dual-polarized antenna which includes at least one dual-polarized element and a signal processing apparatus. Each dual-polarized element includes a first linearly polarized element and a second linearly polarized element that are mutually orthogonal and respectively receive a first wireless signal and a second wireless signal from the receive end. The signal processing apparatus obtains a first energy signal and a second energy signal based on a waveform relationship between the first wireless signal and the second wireless signal. The first energy signal is sent to the receive end by the first linearly polarized element, and the second energy signal is sent to the receive end by the second linearly polarized element. The first energy signal and the second energy signal are combined into an energy signal matching the receive end.

20 Claims, 19 Drawing Sheets

WIRELESS CHARGING TRANSMIT END, METHOD, AND SYSTEM

CROSS-REFERENCE TO RELATED APPLICATION

This application claims priority to Chinese Patent Application No. 202110384215.8, filed on Apr. 9, 2021, which is hereby incorporated by reference in its entirety.

TECHNICAL FIELD

This application relates to the field of wireless charging technologies, and in particular, to a wireless charging transmit end, a method, and a system.

BACKGROUND

With development of smart household and industrial sensors, there are currently a large quantity of sensors. These sensors need to be powered when operating. However, when there are numerous sensors, it is relatively complex to perform cabling in a wired power supply manner. If the sensor is powered by using a battery, battery replacement is also relatively cumbersome when battery power is used up. Therefore, it is increasingly common for a transmit end to supply power to a receive end such as the sensor through wireless charging.

Currently, a wireless charging transmit end transmits energy by using an electromagnetic wave, and a receive end receives electromagnetic wave energy and stores the electromagnetic wave energy to supply power to the receive end. Antennas are disposed on both the wireless charging transmit end and the receive end. Because there are various types of receive ends, and antennas of different receive ends may have different polarization types, when a polarization type of an antenna of a transmit end is inconsistent with a polarization type of an antenna of a receive end, electromagnetic wave energy transmitted by the antenna of the transmit end may not be effectively received by the antenna of the receive end, reducing energy transmission efficiency.

SUMMARY

This application provides a wireless charging transmit end, a method, and a system, wherein an antenna of any polarization type can be matched, thereby improving energy transmission efficiency.

An embodiment of this application provides a wireless charging transmit end, configured to wirelessly charge a receive end, and including a signal processing apparatus and a dual-polarized antenna. The dual-polarized antenna includes at least one dual-polarized element. Each dual-polarized element includes a first linearly polarized element and a second linearly polarized element that are mutually orthogonal. The first linearly polarized element is configured to receive a first wireless signal from a receive end, and the second linearly polarized element is configured to receive a second wireless signal from the receive end. The signal processing apparatus is configured to: obtain a first energy signal and a second energy signal based on a waveform relationship between the first wireless signal and the second wireless signal, send the first energy signal to the first linearly polarized element, and send the second energy signal to the second linearly polarized element. The first linearly polarized element is configured to transmit the first energy signal to the receive end. The second linearly polarized element is configured to transmit the second energy signal to the receive end. The first energy signal and the second energy signal are combined into an energy signal matching a polarized antenna of the receive end.

To improve efficiency of wirelessly charging the receive end by the transmit end, the transmit end provided in this embodiment of this application may automatically implement, based on an antenna type of the receive end, an antenna polarization type matching the receive end. The dual-polarized antenna of the transmit end includes two mutually orthogonal linearly polarized elements. The two mutually orthogonal linearly polarized elements may decompose a wireless signal sent by the receive end into the first wireless signal and the second wireless signal. Therefore, the relationship between the first wireless signal and the second wireless signal can represent the type of the polarized antenna of the receive end. The transmit end generates the first energy signal and the second energy signal based on the relationship between the first wireless signal and the second wireless signal. There is the same relationship between the first energy signal and the second energy signal. Therefore, the energy signal obtained after the first energy signal and the second energy signal are transmitted and combined in the air can match the polarization type of the receive end, and can be efficiently received by the polarized antenna of the receive end, so that efficiency of wirelessly charging the receive end by the transmit end is improved.

In a possible implementation, the waveform relationship refers to a phase difference and an amplitude ratio between the first wireless signal and the second wireless signal. To be specific, the signal processing apparatus obtains the phase difference between the first wireless signal and the second wireless signal and the amplitude ratio between the first wireless signal and the second wireless signal, and generates the first energy signal and the second energy signal based on the phase difference and the amplitude ratio. The phase difference and the amplitude ratio exist between the first energy signal and the second energy signal. There is the same waveform relationship between the first energy signal and the second energy signal. Therefore, the first energy signal and the second energy signal that are transmitted by the transmit end are signals matching the polarized antenna of the receive end, and can be relatively efficiently absorbed by the receive end, so that efficiency of charging the receive end is improved.

In a possible implementation, the signal processing apparatus includes a signal processor and a signal generator. The signal processor receives the first wireless signal and the second wireless signal, obtains the phase difference based on a phase of the first wireless signal and a phase of the second wireless signal, and obtains the amplitude ratio based on amplitude of the first wireless signal and amplitude of the second wireless signal. The signal generator receives the phase difference and the amplitude ratio that are sent by the signal processor, generates the first energy signal and the second energy signal based on the phase difference and the amplitude ratio, sends the first energy signal to the first linearly polarized element, and sends the second energy signal to the second linearly polarized element. The phase difference and the amplitude ratio exist between the first energy signal and the second energy signal. In this embodiment of this application, the signal processor obtains the signals received by the two linearly polarized elements, and obtains the phase difference and the amplitude ratio between the two wireless signals based on the two wireless signals. Then the signal generator generates, based on the phase difference and the amplitude ratio, the two energy signals that need to be transmitted to the receive end. Because the phase difference and the amplitude ratio exist between the two energy signals, the two energy signals can match the type of the polarized antenna of the receive end, so that the two energy signals can be received by the polarized antenna of the receive end to the greatest extent, thereby increasing energy received by the receive end and improving charging efficiency.

To enable the signal processor to accurately obtain the phase difference and the amplitude ratio between the first wireless signal and the second wireless signal, a length of a cable between the first linearly polarized element and the signal processor is preferably equal to a length of a cable between the second linearly polarized element and the signal processor.

In a possible implementation, to reduce hardware and costs, the signal generator and the signal processor may be connected to the linearly polarized element by using a same receive/transmit switching circuit. When the linearly polarized element needs to be connected to the signal processor, the receive/transmit switching circuit performs switching to connect the linearly polarized element and the signal processor. When the linearly polarized element needs to be connected to the signal generator, the receive/transmit switching circuit performs switching to connect the linearly polarized element and the signal generator. For example, the receive/transmit switching circuit may be implemented by a multi-way switch. The transmit end may control a status of the multi-way switch. To be specific, the transmit end provided in this embodiment of this application further includes a first receive/transmit switching circuit and a second receive/transmit switching circuit. A first end of the first receive/transmit switching circuit is connected to the first linearly polarized element, a second end of the first receive/transmit switching circuit is connected to the signal generator, and a third end of the first receive/transmit switching circuit is connected to the signal processor. A first end of the second receive/transmit switching circuit is connected to the second linearly polarized element, a second end of the second receive/transmit switching circuit is connected to the signal generator, and the third end of the second receive/transmit switching circuit is connected to the signal processor. When the transmit end is in a receiving state, the first receive/transmit switching circuit is configured to perform switching to connect the first linearly polarized element and the signal processor, and the second receive/transmit switching circuit is configured to perform switching to connect the second linearly polarized element and the signal processor. When the transmit end is in a transmitting state, the first receive/transmit switching circuit is configured to perform switching to connect the first linearly polarized element and the signal generator, and the second receive/transmit switching circuit is configured to perform switching to connect the second linearly polarized element and the signal generator.

In a possible implementation, to wirelessly charge the receive end relatively quickly, the transmit end may include a plurality of dual-polarized elements, and the plurality of dual-polarized elements may simultaneously transmit energy signals to the receive end. In other words, the dual-polarized antenna includes a plurality of dual-polarized elements, and the plurality of dual-polarized elements are all configured to send energy signals matching the polarized antenna of the receive end to the receive end. For example, the transmit end includes n dual-polarized elements. A spatial location relationship of the n dual-polarized element is not limited in this embodiment of this application. For example, the n dual-polarized elements may be located on a same plane. Specific locations of the n dual-polarized elements on the same plane are not limited. The first dual-polarized element to the $n^{th}$ dual-polarized element may simultaneously transmit energy signals to the receive end by using a beamforming technology, in other words, simultaneously charge the receive end, so that charging of the receive end can be accelerated, and the receive end completes wireless charging in a relatively short period of time, thereby improving charging efficiency.

In a possible implementation, when the transmit end includes a plurality of dual-polarized elements, each dual-polarized element may correspond to one signal generator and one signal processor. Because each dual-polarized element corresponds to one signal generator and one signal processor, each signal generator and signal processor need to process a signal of only one corresponding dual-polarized element, to relieve burden of the signal generator and the signal processor, so that a response can be made, as soon as possible, to a wireless signal sent by the receive end, a corresponding energy signal can be generated as soon as possible, and a response speed can be increased.

In a possible implementation, to reduce hardware costs and save space, the plurality of dual-polarized elements may share one signal processor or one signal generator.

For example, there is one signal processor, and the plurality of dual-polarized elements share one signal processor; or there are a plurality of signal processors, and the plurality of dual-polarized elements are in a one-to-one correspondence with the plurality of signal processors.

In a possible implementation, there are a plurality of signal generators, and the plurality of dual-polarized elements are in a one-to-one correspondence with the plurality of signal generators.

In a possible implementation, the plurality of dual-polarized elements share one signal generator. Therefore, costs can be reduced and space can be saved in terms of hardware, and an integration degree of the transmit end is relatively high, so that a volume of the transmit end is reduced.

In a possible implementation, there are a plurality of first receive/transmit switching circuits, and there are a plurality of second receive/transmit switching circuits; and the plurality of dual-polarized elements are in a one-to-one correspondence with the plurality of first receive/transmit switching circuits, and the plurality of dual-polarized elements are in a one-to-one correspondence with the plurality of second receive/transmit switching circuits.

Because all dual-polarized elements are arranged in an identical manner, the signal processor needs to process a signal received by only one dual-polarized element, in other words, the signal processor can obtain, by analyzing a signal received by one dual-polarized element, amplitude ratios and phase differences corresponding to all the dual-polarized elements. A receive/transmit switching circuit corresponding to only one dual-polarized element is connected to the signal processor, and the other dual-polarized elements are not connected to the signal processor. Because the other dual-polarized elements do not need to send signals to the signal processor, receive/transmit switching circuits may be omitted, and only corresponding transmit circuits are directly connected to the signal generator. Therefore, hardware circuits can be reduced to some extent, and circuit implementation is simple. The signal generator respectively sends a generated first energy signal and a generated second energy signal to a first linearly polarized element and a second linearly polarized element in each of all the dual-polarized elements, in other words, first energy signals transmitted by all the dual-polarized elements are the same, and second energy signals transmitted by all the dual-polarized elements are also the same. It should be understood that the plurality of first energy signals generated by the signal generator may be independently generated, or may be generated by using a power splitter, and the same is true of the plurality of second energy signals.

When the dual-polarized antenna of the transmit end includes a plurality of dual-polarized elements, because each dual-polarized element includes two mutually orthogonal linearly polarized elements, each linearly polarized element can match the polarized antenna of the receive end. A higher polarization type matching degree between the polarized antenna of the transmit end and the polarized antenna of the receive end indicates higher wireless charging efficiency. Because the transmit end includes the plurality of dual-polarized elements, the plurality of dual-polarized elements may simultaneously transmit energy signals to the receive end, so that the transmit end can efficiently wirelessly charge the receive end.

Based on the wireless charging transmit end provided in the foregoing embodiment, an embodiment of this application further provides a method for controlling a wireless charging transmit end. Advantages of the foregoing various implementation solutions of the transmit end are also applicable to the following method, and details are not described herein again. The transmit end includes a signal processing apparatus and a dual-polarized antenna. The dual-polarized antenna includes at least one dual-polarized element. Each dual-polarized element includes a first linearly polarized element and a second linearly polarized element that are mutually orthogonal. The first linearly polarized element receives a first wireless signal from a receive end, and the second linearly polarized element receives a second wireless signal from the receive end. The method includes: obtaining a first energy signal and a second energy signal based on a waveform relationship between the first wireless signal and the second wireless signal, sending the first energy signal to the first linearly polarized element, and sending the second energy signal to the second linearly polarized element, so that the first linearly polarized element and the second linearly polarized element respectively transmit the first energy signal and the second energy signal to the receive end. The first energy signal and the second energy signal are combined into an energy signal matching a polarized antenna of the receive end.

In a possible implementation, the obtaining a first energy signal and a second energy signal based on a waveform relationship between the first wireless signal and the second wireless signal specifically includes: obtaining a phase difference between the first wireless signal and the second wireless signal and an amplitude ratio between the first wireless signal and the second wireless signal; and generating the first energy signal and the second energy signal based on the phase difference and the amplitude ratio. The phase difference and the amplitude ratio exist between the first energy signal and the second energy signal.

In a possible implementation, the obtaining a first energy signal and a second energy signal based on a relationship between the first wireless signal and the second wireless signal specifically includes: obtaining the phase difference based on a phase of the first wireless signal and a phase of the second wireless signal, and obtaining the amplitude ratio based on amplitude of the first wireless signal and amplitude of the second wireless signal; and generating the first energy signal and the second energy signal based on the phase difference and the amplitude ratio. The phase difference and the amplitude ratio exist between the first energy signal and the second energy signal.

An embodiment of this application further provides a wireless charging system, including a receive end and the foregoing transmit end. The transmit end is configured to transmit an energy signal to the receive end by using a dual-polarized antenna to charge the receive end. The wireless charging system provided in this embodiment of this application may be applied to scenarios such as smart household and industrial sensing measurement. During industrial sensing measurement, a large quantity of sensor nodes are required. These sensor nodes need to be powered. To simplify workload of wiring and cabling, these sensor nodes may be powered through the foregoing wireless charging.

In a possible implementation, the system includes a plurality of receive ends. The transmit end is configured to separately wirelessly charge the plurality of receive ends by using the dual-polarized antenna. In this embodiment, one transmit end may charge a plurality of receive ends, for example, may charge receive ends of different types or a same type when being applied to a home. In addition, in a factory, one transmit end may wirelessly charge a plurality of receive ends such as sensors. In this way, a quantity of transmit ends can be reduced, and wireless charging costs can be reduced.

This application has at least the following advantages.

The wireless charging transmit end provided in embodiments of this application is configured to wirelessly charge a receive end. Although signals of the transmit end and the receive end are wireless signals, different from conventional wireless communication, the transmit end is mainly configured to transmit energy to the receive end. Therefore, it is not enough for the receive end to receive the energy, but instead, the receive end needs to receive as much energy as possible, so that corresponding charging efficiency is as high as possible. Therefore, all the energy transmitted by the transmit end should be received by the receive end to the greatest extent. To improve efficiency of wirelessly charging the receive end by the transmit end, the transmit end provided in embodiments of this application may automatically implement, based on an antenna type of the receive end, an antenna polarization type matching the receive end. A dual-polarized antenna of the transmit end includes two mutually orthogonal linearly polarized elements. The two mutually orthogonal linearly polarized elements may decompose a wireless signal sent by the receive end into a first wireless signal and a second wireless signal. Therefore, a relationship between the first wireless signal and the second wireless signal can represent a type of a polarized antenna of the receive end. The transmit end generates a first energy signal and a second energy signal based on the relationship between the first wireless signal and the second wireless signal. There is the same relationship between the first energy signal and the second energy signal. Therefore, an energy signal obtained after the first energy signal and the second energy signal are transmitted and combined in the air can match the polarization type of the receive end, and can be efficiently received by the polarized antenna of the receive end, so that efficiency of wirelessly charging the receive end by the transmit end is improved.

BRIEF DESCRIPTION OF DRAWINGS

FIG. 11A-1 to FIG. 11A-3 are a schematic diagram of another wireless charging transmit end according to an embodiment of this application;

DETAILED DESCRIPTION

The following describes technical solutions in embodiments of this application with reference to the accompanying drawings.

The following terms "first", "second", and the like are merely intended for a purpose of description, and shall not be understood as an indication or implication of relative importance or implicit indication of a quantity of indicated technical features. Therefore, a feature limited by "first", "second", or the like may explicitly or implicitly include one or more features. In the descriptions of this application, unless otherwise stated, "a plurality of" means two or more than two.

In this application, it should be noted that the term "connection" should be understood in a broad sense unless otherwise expressly specified and limited. For example, the "connection" may be a fixed connection, or may be a detachable connection, or may be an integral connection; may be a direct connection, or may be an indirect connection implemented by using a medium. In addition, the term "coupled" may be a manner of implementing an electrical connection for signal transmission. The "coupling" may be a direct electrical connection, or may be an indirect electrical connection through an intermediate medium.

To enable a person skilled in the art to better understand technical solutions provided in embodiments of this application, the following first describes an application scenario with reference to the accompanying drawings.

Figure 1:
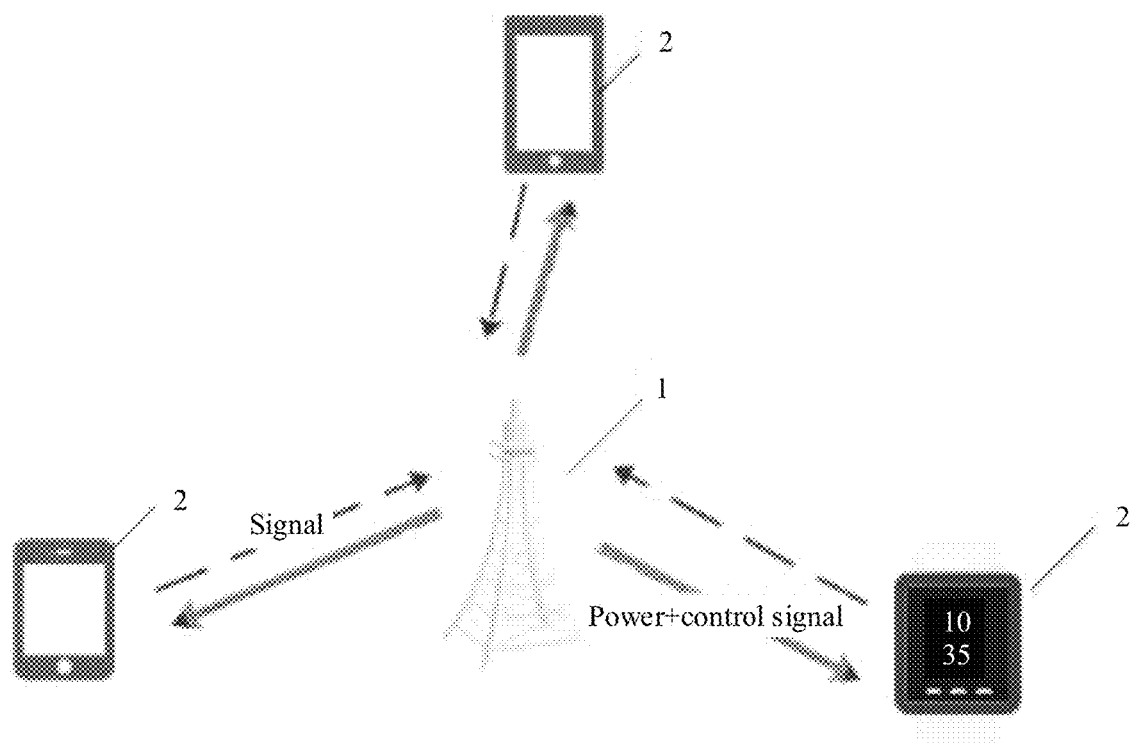
FIG. 1 is a schematic diagram of a wireless charging system according to an embodiment of this application.

FIG. 1 is a schematic diagram of a wireless charging system according to an embodiment of this application.

A wireless charging transmit end provided in embodiments of this application is applied to a wireless charging system. The wireless charging system usually includes a transmit end and a receive end. The transmit end is configured to transmit electrical energy in an electromagnetic field form, and the receive end receives an electromagnetic field signal transmitted by the transmit end, and converts the electromagnetic field signal to supply power to the receive end or charge a battery.

The wireless charging system provided in this embodiment of this application includes a transmit end 1 and a receive end 2. The transmit end 1 wirelessly charges the receive end 2.

A quantity of receive ends in the wireless charging system is not specifically limited in the following embodiments. For example, the transmit end may wirelessly charge one receive end, or may wirelessly charge a plurality of receive ends. An example in which the wireless charging system in FIG. 1 includes one transmit end 1 and three receive ends 2 is used for description.

A manner in which the transmit end charges the plurality of receive ends is not limited in the embodiments. For example, when wirelessly charging the plurality of receive ends simultaneously, the transmit end may evenly charge each receive end. In other words, all the receive ends receive same energy. Alternatively, when a receive end in the plurality of receive ends has a relatively low battery level, the transmit end may preferentially charge the receive end with the relatively low battery level.

The transmit end 1 is not specifically limited in the embodiments. For example, the transmit end 1 may be a device such as a base station, a router, or a radio frequency charging station.

The receive end 2 is not specifically limited in the embodiments. For example, based on whether a location of the receive end moves when the receive end works, there may be two types of receive ends: a mobile terminal or a stationary terminal. For example, the mobile terminal may be a communications terminal (a mobile phone), a sound generation device (for example, a sounder), or a wearable device (for example, a watch, a wristband, or a headset). The stationary terminal may include a sensor and an internet of things device. Taking FIG. 1 as an example, the transmit end 1 is a base station, and the three receive ends 2 are a mobile phone, a tablet computer, and a smartwatch. The base station wirelessly charges the mobile phone, the tablet computer, and the smartwatch.

The foregoing wireless charging system usually wirelessly supplies power remotely, and is different from a wireless charger of a terminal device such as a mobile phone. A wireless charger of a mobile phone is quite close to the mobile phone when charging the mobile phone. For example, the mobile phone is directly placed on the wireless charger.

Figure 2:
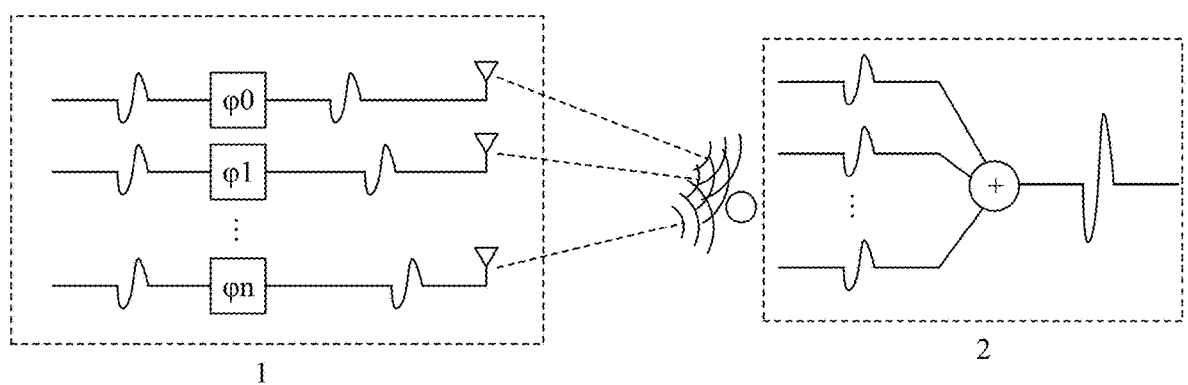
FIG. 2 is a schematic diagram of wireless charging according to an embodiment of this application.

FIG. 2 is a schematic diagram of wireless charging according to an embodiment of this application.

In common remote wireless power supply, a transmit end 1 transmits energy by using an electromagnetic wave, and a receive end 2 receives the electromagnetic wave energy, and performs storage and supplies power. The transmit end 1 concentrates energy by using a beamforming (BF) technology, in other words, propagates an electromagnetic wave only in a specific direction. In beamforming, a plurality of wave sources can transmit electromagnetic waves by using an antenna array, relative phases and amplitude of the electromagnetic waves transmitted by the plurality of wave sources are controlled, so that radiation gains of the plurality of electromagnetic waves are concentrated in one direction, namely, a location of the receive end 2, and radiation gains of the electromagnetic waves in other directions are quite small.

Figure 3:
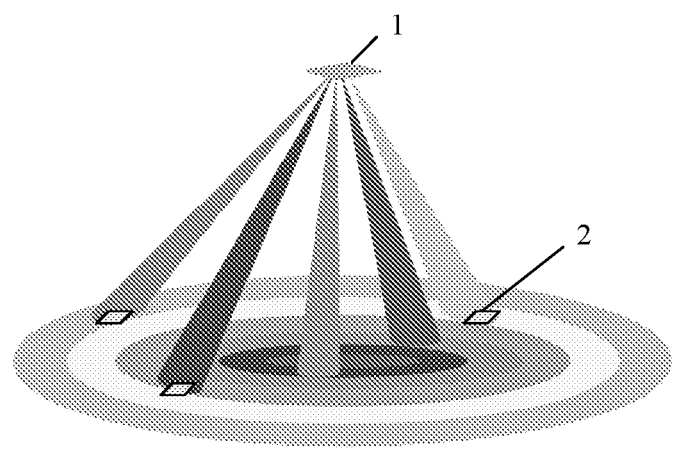
FIG. 3 is a schematic diagram of a wireless power supply apparatus installed on the top of a ceiling according to an embodiment of this application.

With reference to FIG. 3, the following describes an implementation in which a transmit end disposed on the top of a ceiling supplies power to a receive end by using a beamforming technology.

FIG. 3 is a schematic diagram of a wireless power supply apparatus installed on the top of a ceiling according to an embodiment of this application.

After being installed on the top of a ceiling, a transmit end 1 supplies power to a receive end 2 in a wireless power supply range of the transmit end 1. As can be learned from FIG. 3, the transmit end 1 can simultaneously wirelessly supply power to a plurality of receive ends, and the transmit end can supply power to the receive end 2 by using a beamforming technology.

Electrical energy required when the receive end 2 is powered on for the first time may be completely provided by the transmit end 1, or may be provided by using an external auxiliary power supply, for example, a small-capacity battery, an external USB power supply, or an Near Field Communication (NFC) device.

In some embodiments, there is no battery inside the receive end 2, or a battery is disposed inside the receive end 2 but the battery does not store power. In this case, electrical energy required when the receive end 2 is powered on for the first time is provided by the transmit end 1, but the receive end 2 cannot send a direction finding signal, and therefore the receive end 2 needs to wait for the transmit end 1 to provide electrical energy in a blind scanning manner using an electromagnetic wave.

When an antenna transmits an electromagnetic wave, strength of an electric field formed by the electromagnetic wave has a specific direction, namely, antenna polarization.

Figure 4:
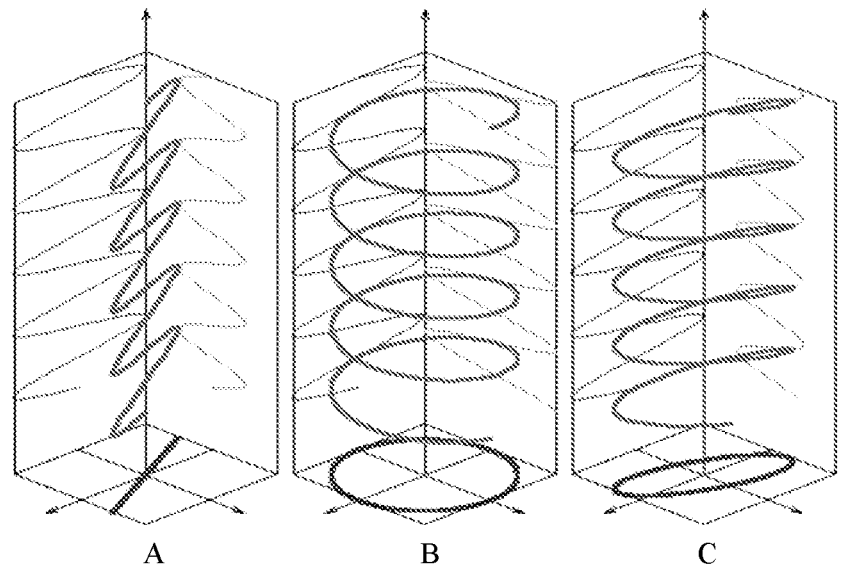
FIG. 4 is a schematic diagram of three different types of antenna polarization.

FIG. 4 is a schematic diagram of three different types of antenna polarization.

As can be learned from FIG. 4, antenna polarization sequentially includes linear polarization A, circular polarization B, and elliptic polarization C from left to right.

Currently, common linear polarization includes horizontal polarization and vertical polarization. Using the ground as a parameter, polarization in which a vector direction of an electric field is parallel to the ground is referred to as horizontal polarization, and polarization in which a vector direction of an electric field is perpendicular to the ground is referred to as vertical polarization.

Circular polarization is further classified into left-handed circular polarization and right-handed circular polarization. If a plane of polarization rotates with time and is right-handed with respect to an electromagnetic wave propagation direction, the polarization is referred to as right-handed circular polarization. On the contrary, if a plane of polarization is left-handed with respect to an electromagnetic wave propagation direction, the polarization is referred to as left-handed circular polarization.

Similarly, elliptic polarization may also be classified into right-handed polarization and left-handed polarization.

During wireless charging, a transmit end provides an energy signal to a receive end, and it is expected that as much energy as possible is received by the receive end, in other words, charging efficiency is relatively high. If energy is lost in a transmission process and does not reach the receive end, charging efficiency is relatively low.

If a polarization type of an antenna of the transmit end matches a polarization type of an antenna of the receive end, wireless charging efficiency is relatively high. When a polarization type of an antenna of the transmit end does not match a polarization type of an antenna of the receive end, wireless charging efficiency is relatively low.

However, corresponding polarization types of antennas of different receive ends may be different. Therefore, when a same transmit end wirelessly charges or supplies power to different receive ends, it is difficult to match polarization types of all the receive ends. In this case, charging efficiency of some receive ends is relatively low.

An embodiment of this application provides a wireless charging transmit end. The transmit end may match an antenna of any polarization type, so that the transmit end can wirelessly charge different receive ends while relatively high energy transmission efficiency, namely, relatively high wireless charging efficiency, can be ensured. The transmit end provided in this embodiment of this application includes a dual-polarized antenna, and the dual-polarized antenna includes two mutually perpendicular linearly polarized elements. A signal transmitted by an antenna is a sine signal. Two mutually perpendicular linearly polarized elements may be used to obtain polarization of any direction through combination.

In three-dimensional space, a transient electric field of an electromagnetic wave propagated in a Z-axis direction may be expressed as follows:

$$E = Ex + Ey, \text{ where}$$

Ex and Ey are respectively components in an X-axis direction and a Y-axis direction. In other words, the electromagnetic wave propagated in the Z-axis direction may be decomposed into two linearly polarized electromagnetic waves in the X-axis direction and the Y-axis direction.

When a phase difference between Ex and Ey is $n\pi$ (n=1, 2, 3 . . . ), a polarization type is linear polarization. When a phase difference between Ex and Ey is $(2n+1)\pi/2$ (n=1, 2, 3 . . . ), and amplitude of Ex and Ey is equal, a polarization type is circular polarization. When neither a phase difference between Ex and Ey nor amplitude of Ex and Ey meets the foregoing conditions, a track of an endpoint of a composite vector is an ellipse, and a polarization type is elliptic polarization. A ratio of a long axis to a short axis of an elliptic polarization wave is referred to as an axis ratio. When an axis ratio of an ellipse is equal to 1 (amplitude is equal), an elliptic polarization wave is a circular polarization wave. When an axis ratio is infinite, a polarization type is linear polarization.

Charging efficiency of a remote wireless charging system is affected by polarization matching between an antenna of a transmit end and an antenna of a receive end. When the antenna of the receive end does not match the antenna of the transmit end due to an installation manner, a location, a movement, or the like, energy transmission efficiency is greatly reduced. When polarization directions of the antenna of the transmit end and the antenna of the receive end are completely orthogonal, energy transmission efficiency is 0.

The dual-polarized antenna of the transmit end provided in this embodiment of this application includes a pair of orthogonal linearly polarized elements, to obtain any polarization manner through combination, so that polarization matching between antennas during wireless charging is improved. Theoretically, 100% polarization matching with the polarized antenna of the receive end can be implemented.

Figure 5:
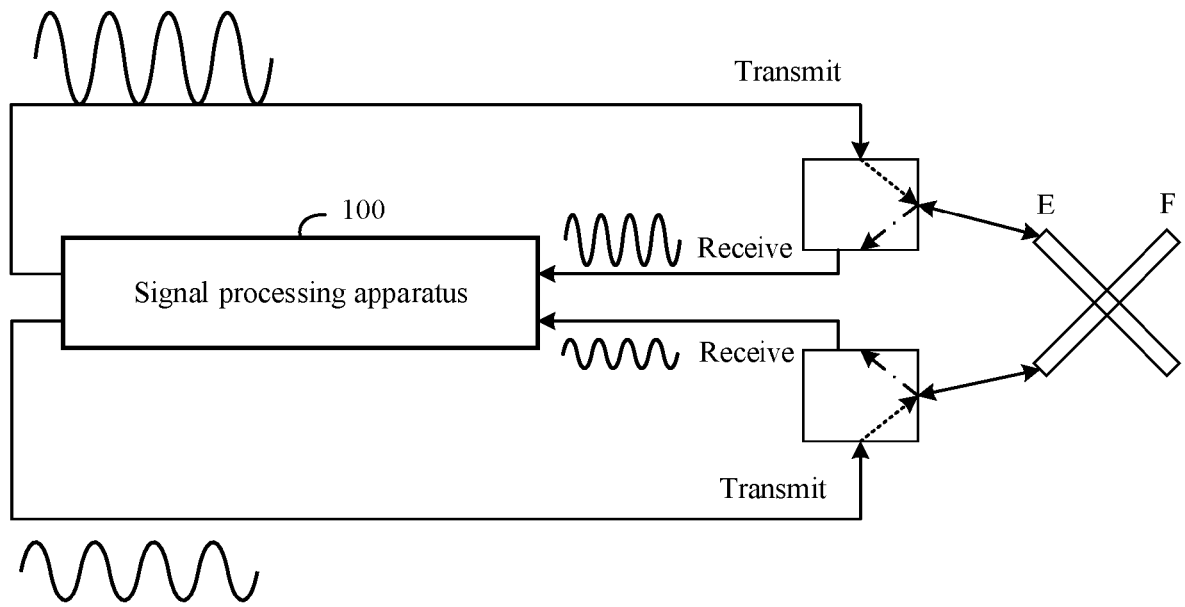
FIG. 5 is a schematic diagram of a wireless charging transmit end according to an embodiment of this application.

FIG. 5 is a schematic diagram of a wireless charging transmit end according to an embodiment of this application.

The wireless charging transmit end provided in this embodiment of this application is configured to wirelessly charge a receive end. The transmit end includes a signal processing apparatus 100 and a dual-polarized antenna. The dual-polarized antenna includes at least one dual-polarized element. A quantity of dual-polarized elements included in the dual-polarized antenna is not limited in this embodiment of this application. The dual-polarized antenna may include one dual-polarized element, or may include a plurality of dual-polarized elements. When the dual-polarized antenna includes a plurality of dual-polarized elements, the plurality of dual-polarized elements may form an antenna array. The antenna array may concentrate energy on the receive end by using the foregoing beamforming technology, to wirelessly charge the receive end. It should be understood that when the dual-polarized antenna includes one dual-polarized element, energy transmitted to the receive end is limited, and therefore the receive end is relatively slowly charged. When the dual-polarized antenna includes a plurality of dual-polarized elements, the plurality of dual-polarized elements may simultaneously transmit energy signals to the receive end, so that the receive end can be relatively quickly charged.

Each dual-polarized element includes a first linearly polarized element E and a second linearly polarized element F that are mutually orthogonal. In other words, the first linearly polarized element E and the second linearly polarized element F are perpendicular to each other. It should be understood that the first linearly polarized element E and the second linearly polarized element F can transmit energy signals output by the signal processing apparatus 100, and can also receive wireless signals transmitted by a polarized antenna of the receive end. In this embodiment of this application, the first linearly polarized element E and the second linearly polarized element F that are perpendicular to each other are disposed to obtain, through combination, or decompose a linearly polarized signal of any direction, to adapt to various polarization types.

The first linearly polarized element E is configured to receive a first wireless signal from the receive end. The second linearly polarized element F is configured to receive a second wireless signal from the receive end. Because the first linearly polarized element E and the second linearly polarized element F are perpendicular to each other, although the receive end transmits one wireless signal, the wireless signals received by the first linearly polarized element E and the second linearly polarized element F are independent of each other.

The signal processing apparatus 100 may obtain a first energy signal and a second energy signal based on a waveform relationship between the first wireless signal and the second wireless signal, send the first energy signal to the first linearly polarized element E, and send the second energy signal to the second linearly polarized element F.

The signal processing apparatus 100 may obtain the waveform relationship between the first wireless signal and the second wireless signal based on the first wireless signal and the second wireless signal. Because the receive end transmits one signal, and the first linearly polarized element E and the second linearly polarized element F decompose the signal sent by the receive end into the first wireless signal and the second wireless signal, the signal processing apparatus 100 may learn a type of the polarized antenna of the receive end based on the relationship between the first wireless signal and the second wireless signal. The signal processing apparatus 100 may obtain, through inverse simulation based on the relationship between the first wireless signal and the second wireless signal, a polarized signal matching the receive end, namely, polarization required by the receive end, to generate, based on the relationship between the first wireless signal and the second wireless signal, the first energy signal that needs to be transmitted by the first linearly polarized element E and generate, based on the relationship between the first wireless signal and the second wireless signal, the second energy signal that needs to be transmitted by the second linearly polarized element F.

For example, in a possible implementation, the signal processing apparatus 100 is configured to: obtain a phase difference between the first wireless signal and the second wireless signal and an amplitude ratio between the first wireless signal and the second wireless signal based on a waveform of the first wireless signal and a waveform of the second wireless signal, and generate the first energy signal and the second energy signal based on the phase difference and the amplitude ratio. The obtained phase difference and amplitude ratio exist between the first energy signal and the second energy signal. For example, if a phase difference between the first wireless signal and the second wireless signal is a first phase difference, and a phase difference between the first energy signal and the second energy signal is a second phase difference, the second phase difference is equal to the first phase difference, in other words, the phase differences are equal. If an amplitude ratio between the first wireless signal and the second wireless signal is a first amplitude ratio, and an amplitude ratio between the first energy signal and the second energy signal is a second amplitude ratio, the second amplitude ratio is equal to the first amplitude ratio, in other words, the amplitude ratios are equal. It should be understood that "equal" may mean "completely equal" or may mean that there is a specific error. When "equal" means "completely equal", a matching effect between an antenna of the transmit end and the antenna of the receive end is the highest, and wireless charging efficiency is the highest. For example, when the phase differences are not completely equal and there is a specific error, the matching effect between the antenna of the transmit end and the antenna of the receive end is slightly poor. In this embodiment of this application, the first phase difference is not necessarily completely equal to the second phase difference, provided that a difference between the first phase difference and the second phase difference falls within a preset range, in other words, the first phase difference and the second phase difference are consistent.

For example, as can be schematically learned from FIG. 5, amplitude of the first wireless signal is greater than amplitude of the second wireless signal, and correspondingly, amplitude of the first energy signal is greater than amplitude of the second energy signal. Similarly, if a phase of the first wireless signal is ahead of a phase of the second wireless signal, a phase of the first energy signal is also ahead of a phase of the second energy signal. If a phase of the first wireless signal is the same as a phase of the second wireless signal, a phase of the first energy signal is also the same as a phase of the second energy signal.

The amplitude ratio may represent shapes of the first wireless signal and the second wireless signal, namely, strength of the wireless signals, so that shapes of the first energy signal and the second energy signal can be simulated based on the amplitude ratio.

The first linearly polarized element E transmits the first energy signal to the receive end, and the second linearly polarized element F transmits the second energy signal to the receive end. It should be understood that the first linearly polarized element E and the second linearly polarized element F separately send respective energy signals, instead of combining the energy signals before sending.

The first energy signal and the second energy signal are combined into an energy signal matching the polarized antenna of the receive end. It should be understood that the receive end can receive both the first energy signal and the second energy signal. Because a relationship between the first energy signal and the second energy signal conforms to the polarization type of the polarized antenna of the receive end, when being transmitted in the air, the first energy signal and the second energy signal can be automatically combined into the energy signal required by the receive end.

The wireless charging transmit end provided in this embodiment of this application is configured to wirelessly charge the receive end. Although signals of the transmit end and the receive end are wireless signals, different from conventional wireless communication, the transmit end is mainly configured to transmit energy to the receive end. Therefore, it is not enough for the receive end to receive the energy, but instead, the receive end needs to receive as much energy as possible, so that corresponding charging efficiency is as high as possible. Therefore, all the energy transmitted by the transmit end should be received by the receive end to the greatest extent. To improve efficiency of wirelessly charging the receive end by the transmit end, the transmit end provided in this embodiment of this application may automatically implement, based on the antenna type of the receive end, an antenna polarization type matching the receive end. The dual-polarized antenna of the transmit end includes two mutually orthogonal linearly polarized elements. The two mutually orthogonal linearly polarized elements may decompose a wireless signal sent by the receive end into the first wireless signal and the second wireless signal. Therefore, the waveform relationship between the first wireless signal and the second wireless signal can represent the type of the polarized antenna of the receive end. The transmit end generates the first energy signal and the second energy signal based on the waveform relationship between the first wireless signal and the second wireless signal. There is the same waveform relationship between the first energy signal and the second energy signal. Therefore, an energy signal obtained after the first energy signal and the second energy signal are transmitted and combined in the air can match the polarization type of the receive end, and can be efficiently received by the polarized antenna of the receive end, so that efficiency of wirelessly charging the receive end by the transmit end is improved.

Transmit End Embodiment

With reference to the accompanying drawings, the following describes in detail an implementation of a wireless charging transmit end according to an embodiment of this application.

Figure 6:
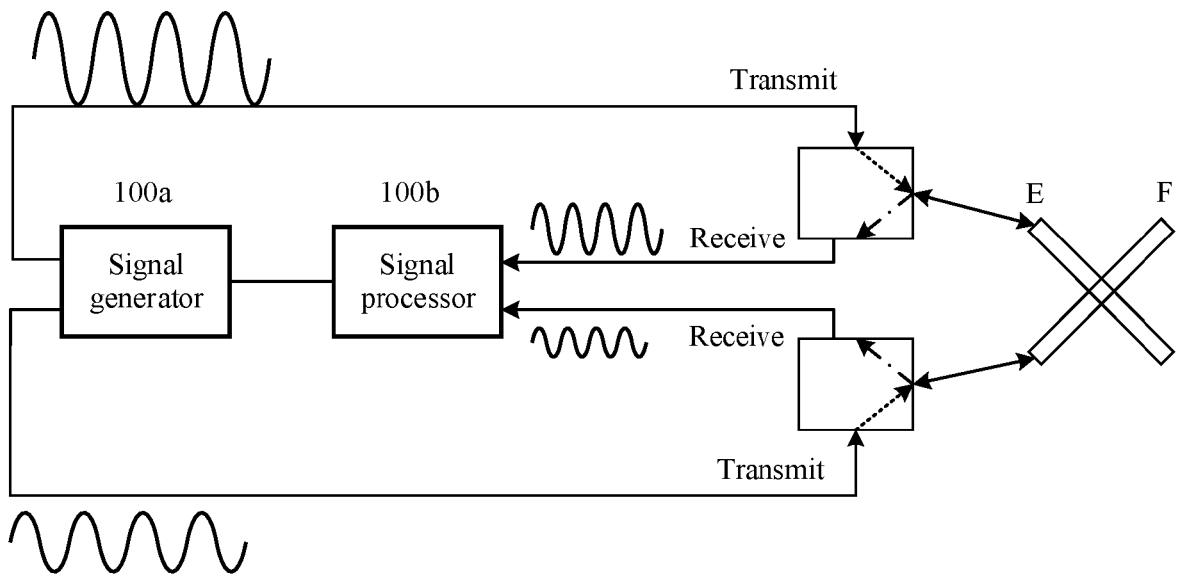
FIG. 6 is a schematic diagram of another wireless charging transmit end according to an embodiment of this application.

FIG. 6 is a schematic diagram of another wireless charging transmit end according to an embodiment of this application.

A signal processing apparatus in the transmit end according to this embodiment of this application includes a signal processor $100b$ and a signal generator $100a$.

The signal processor $100b$ is configured to receive a first wireless signal and a second wireless signal, obtain a phase difference based on a phase of the first wireless signal and a phase of the second wireless signal, and obtain an amplitude ratio based on amplitude of the first wireless signal and amplitude of the second wireless signal.

The signal processor $100b$ may be implemented by a circuit, or may be implemented by an integrated chip. A specific implementation of the signal processor $100b$ is not specifically limited in this embodiment of this application.

The signal processor $100b$ can obtain the phase of the first wireless signal, and can obtain the phase of the second wireless signal, to obtain a difference between the phase of the first wireless signal and the phase of the second wireless signal, that is, to obtain the phase difference. Similarly, the signal processor $100b$ can also obtain the amplitude of the first wireless signal and the amplitude of the second wireless signal, to obtain a ratio between the amplitude of the first wireless signal and the amplitude of the second wireless signal, that is, to obtain the amplitude ratio. This can be understood as that the signal processor $100b$ notifies the signal generator $100a$ of feature information of the first wireless signal and the second wireless signal, and the signal generator $100a$ inverts features of the two energy signals to be transmitted based on the feature information.

The signal generator $100a$ is configured to: receive the phase difference and the amplitude ratio sent by the signal processor $100b$; and generate a first energy signal and a second energy signal based on the phase difference and the amplitude ratio. The phase difference and the amplitude ratio exist between the first energy signal and the second energy signal. The first energy signal is sent to a first linearly polarized element, and the second energy signal is sent to a second linearly polarized element.

A waveform relationship between the first energy signal and the second energy signal is the same as a waveform relationship between the first wireless signal and the second wireless signal. The waveform relationship herein refers to an amplitude ratio and a phase difference between waveforms of two signals, in other words, a shape of the two signals is concerned. Because the first wireless signal and the second wireless signal are signals decomposed by the first linearly polarized element and the second linearly polarized element, an energy signal obtained by combining the first energy signal and the second energy signal matches a type of a polarized antenna at a receive end, and can be efficiently received by the polarized antenna of the receive end. This ensures that an energy signal transmitted by the transmit end is absorbed by the receive end to efficiently charge the receive end.

The signal generator $100a$ may be implemented by a processor, or may be implemented by another chip.

Because the first linearly polarized element E and the second linearly polarized element F can not only receive a signal but also transmit a signal, switching between a receive channel and a transmit channel needs to be performed by using a receive/transmit switching circuit.

Figure 7:
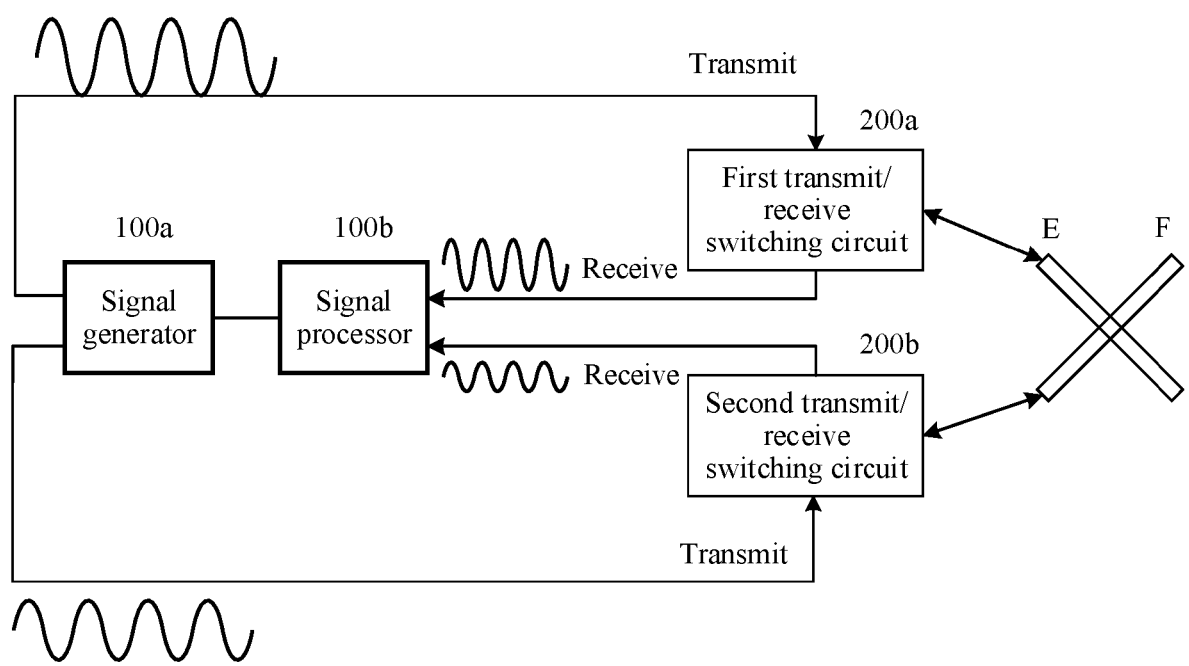
FIG. 7 is a schematic diagram of another wireless charging transmit end according to an embodiment of this application.

FIG. 7 is a schematic diagram of another wireless charging transmit end according to an embodiment of this application.

The wireless charging transmit end according to this embodiment of this application further includes a first receive/transmit switching circuit $200a$ and a second receive/transmit switching circuit $200b$.

A first end of the first receive/transmit switching circuit $200a$ is connected to a first linearly polarized element E, and a second end of the first receive/transmit switching circuit 200a is connected to a signal generator 100a. A third end of the first receive/transmit switching circuit 200a is connected to a signal processor 100b.

A first end of the second receive/transmit switching circuit 200b is connected to a second linearly polarized element F, and a second end of the second receive/transmit switching circuit 200b is connected to the signal generator 100a. A third end of the second receive/transmit switching circuit 200b is connected to the signal processor 100b.

It can be learned from FIG. 7 that both the first receive/transmit switching circuit 200a and the second receive/transmit switching circuit 200b are three-port devices, and can perform switching to connect an antenna and the signal generator 100a, or perform switching to connect an antenna and the signal processor 100b. In a specific implementation, both the first receive/transmit switching circuit 200a and the second receive/transmit switching circuit 200b may be implemented by multi-way switching switches.

When the transmit end is in a receiving state, the first receive/transmit switching circuit 200a is configured to perform switching to connect the first linearly polarized element E and the signal processor 100b, and the second receive/transmit switching circuit 200b is configured to perform switching to connect the second linearly polarized element F and the signal processor 100b. In other words, when the transmit end receives an energy signal transmitted by the receive end, the dual-polarized antenna is connected to the signal processor 100b.

When the transmit end is in a transmitting state, the first receive/transmit switching circuit 200a is configured to perform switching to connect the first linearly polarized element E and the signal generator 100a, and the second receive/transmit switching circuit 200b is configured to perform switching to connect the second linearly polarized element F and the signal generator 100a. In other words, when the transmit end transmits an energy signal, the dual-polarized antenna is connected to the signal generator 100a.

A manner of connecting each receive/transmit switching circuit to the antenna is not limited in embodiments of this application, provided that each receive/transmit switching circuit is electrically connected.

Examples in which there is one dual-polarized element are described in the foregoing embodiments. To wirelessly charge the receive end relatively quickly, the transmit end may include a plurality of dual-polarized elements, and the plurality of dual-polarized element can simultaneously transmit energy signals to the receive end. The following describes a working principle when the transmit end includes a plurality of dual-polarized elements according to embodiments of this application with reference to the accompanying drawings. The following describes examples in which the transmit end includes n dual-polarized elements. A spatial location relationship of the n dual-polarized element is not limited in embodiments of this application. For example, the n dual-polarized elements may be located on a same plane. Specific locations of the n dual-polarized elements on the same plane are not limited.

Figure 8A:
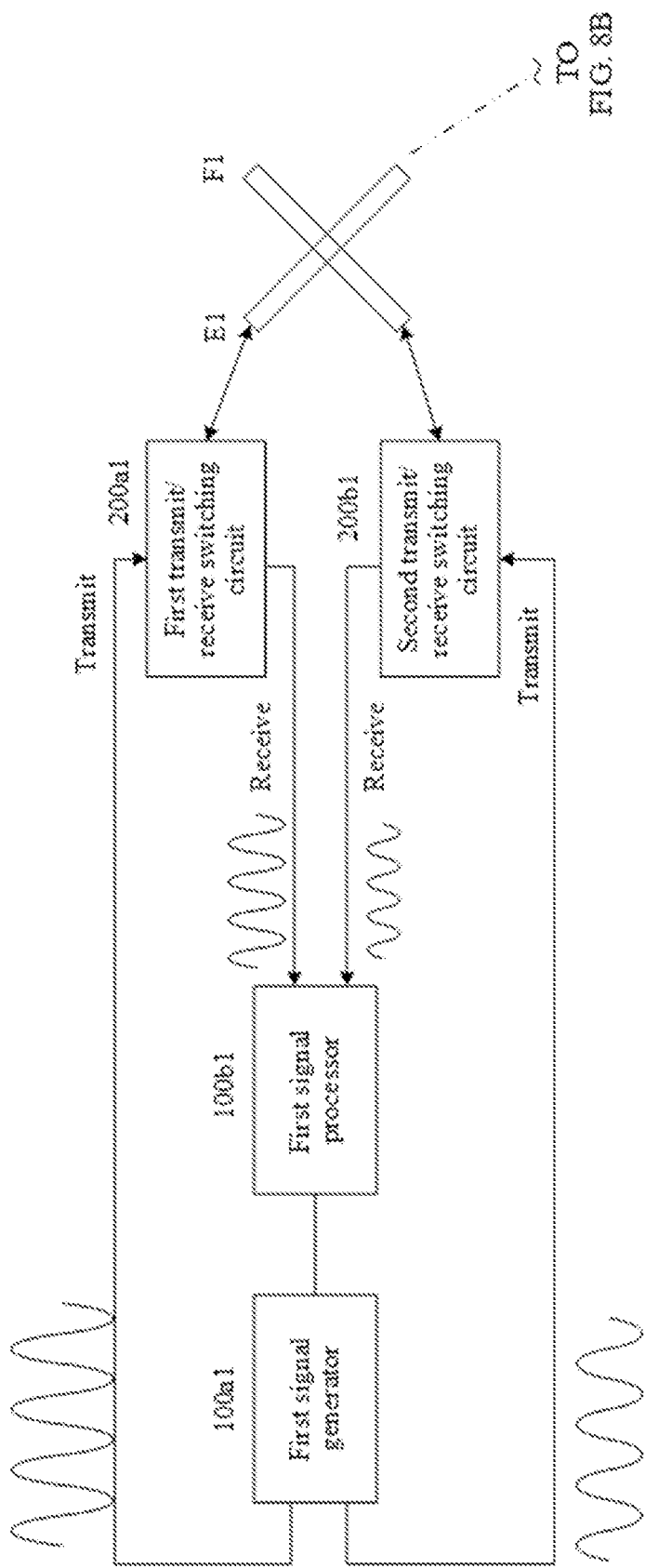
FIG. 8A to FIG. 8C are a schematic diagram of another wireless charging transmit end according to an embodiment of this application.
Figure 8B:
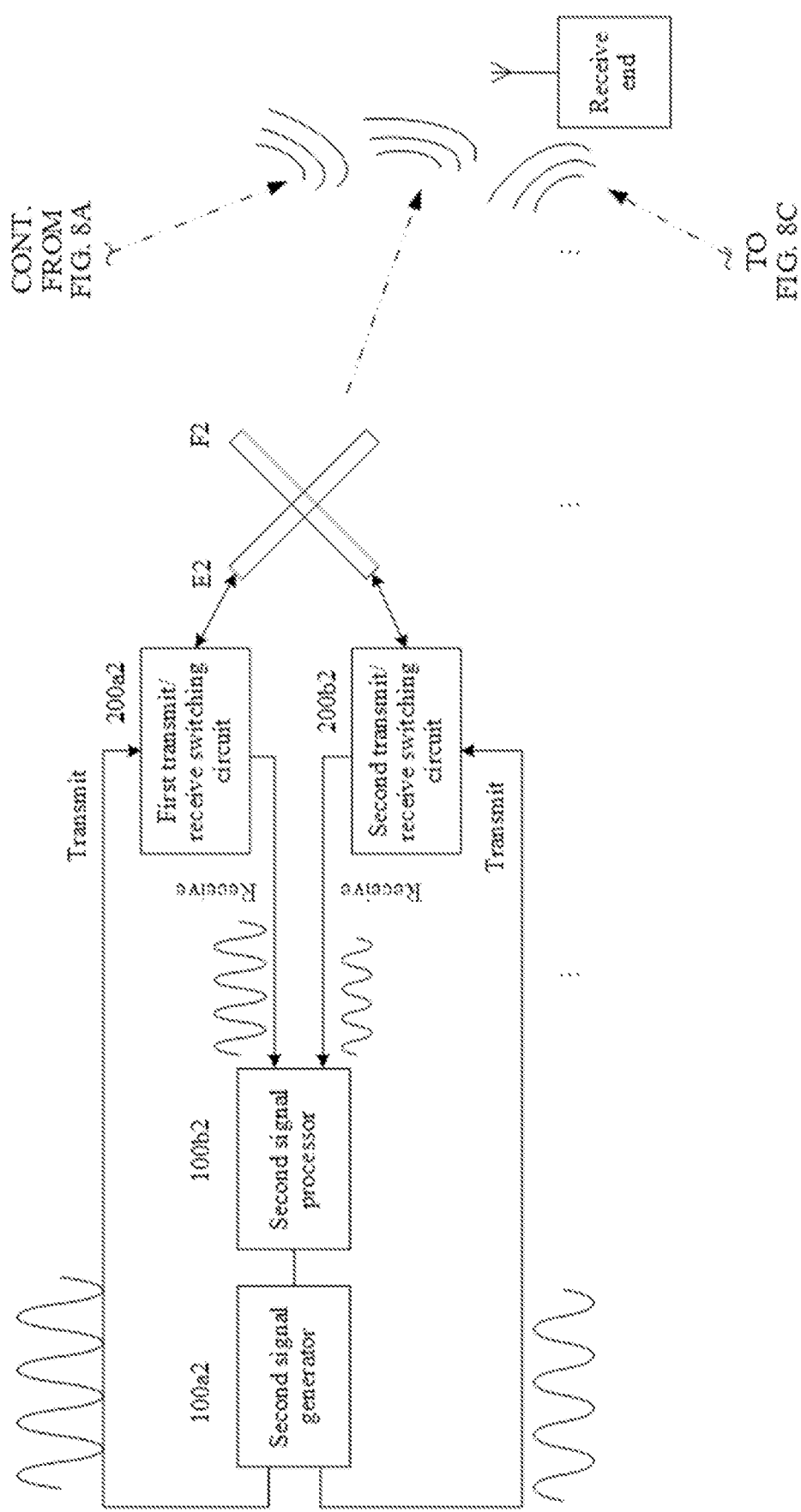
Figure 8C:
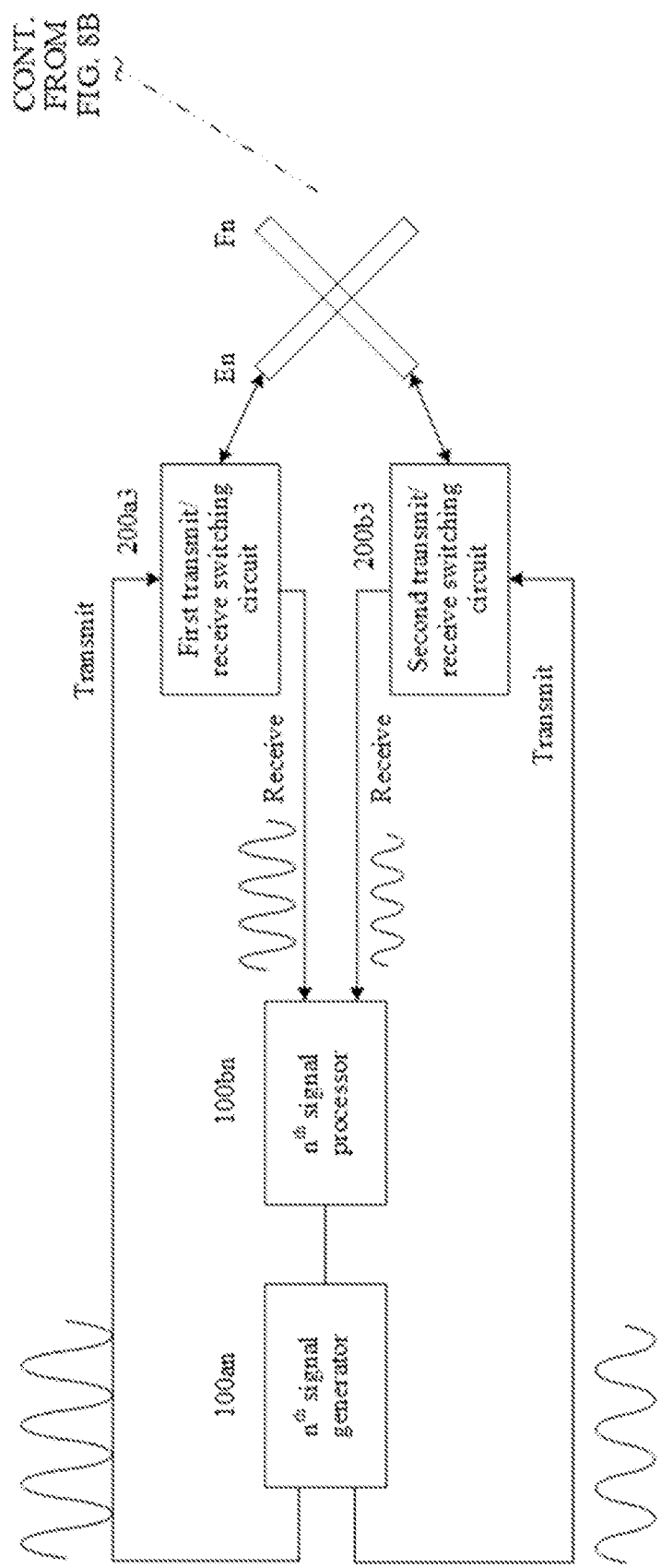

FIG. 8A to FIG. 8C are a schematic diagram of another wireless charging transmit end according to an embodiment of this application.

n dual-polarized elements include the first dual-polarized element, the second dual-polarized element, and the $n^{th}$ dual-polarized element.

The first dual-polarized element includes two mutually orthogonal linearly polarized elements E1 and F1, the second dual-polarized element includes two mutually orthogonal linearly polarized elements E2 and F2, and similarly, the $n^{th}$ dual-polarized element includes two mutually orthogonal linearly polarized elements En0 and Fn.

Each dual-polarized element in this embodiment is in a one-to-one correspondence with a first receive/transmit switching circuit, a second receive/transmit switching circuit, a first signal processor, and a first signal generator.

As shown in FIG. 8A to FIG. 8C, a first linearly polarized element E1 in the first dual-polarized element corresponds to a first receive/transmit switching circuit 200a1, and a second linearly polarized element F1 in the first dual-polarized element corresponds to a second receive/transmit switching circuit 200b1. A first linearly polarized element E2 in the second dual-polarized element corresponds to a first receive/transmit switching circuit 200a2, and a second linearly polarized element F2 in the second dual-polarized element corresponds to a second receive/transmit switching circuit 200b2. Similarly, a first linearly polarized element En in the $n^{th}$ dual-polarized element corresponds to a first receive/transmit switching circuit 200an, and a second linearly polarized element Fn in the $n^{th}$ dual-polarized element corresponds to the second receive/transmit switching circuit 200bn. In addition, the first dual-polarized element corresponds to a first signal processor 100b1 and a first signal generator 100a1, the second dual-polarized element corresponds to a second signal processor 100b2 and a second signal generator 100a2, and the $n^{th}$ dual-polarized element corresponds to an $n^{th}$ signal processor 100bn and an $n^{th}$ signal generator 100an.

The first dual-polarized element to the $n^{th}$ dual-polarized element may simultaneously transmit energy signals to a receive end by using a beamforming technology, in other words, simultaneously charge the receive end, so that charging of the receive end can be accelerated, and the receive end completes wireless charging in a relatively short period of time, thereby improving charging efficiency.

In addition, because each dual-polarized element corresponds to one signal generator and one signal processor, each signal generator and signal processor need to process a signal of only one corresponding dual-polarized element, to relieve burden of the signal generator and the signal processor, so that a response can be made, as soon as possible, to a wireless signal sent by the receive end, a corresponding energy signal can be generated as soon as possible, and a response speed can be increased.

Figure 9A:
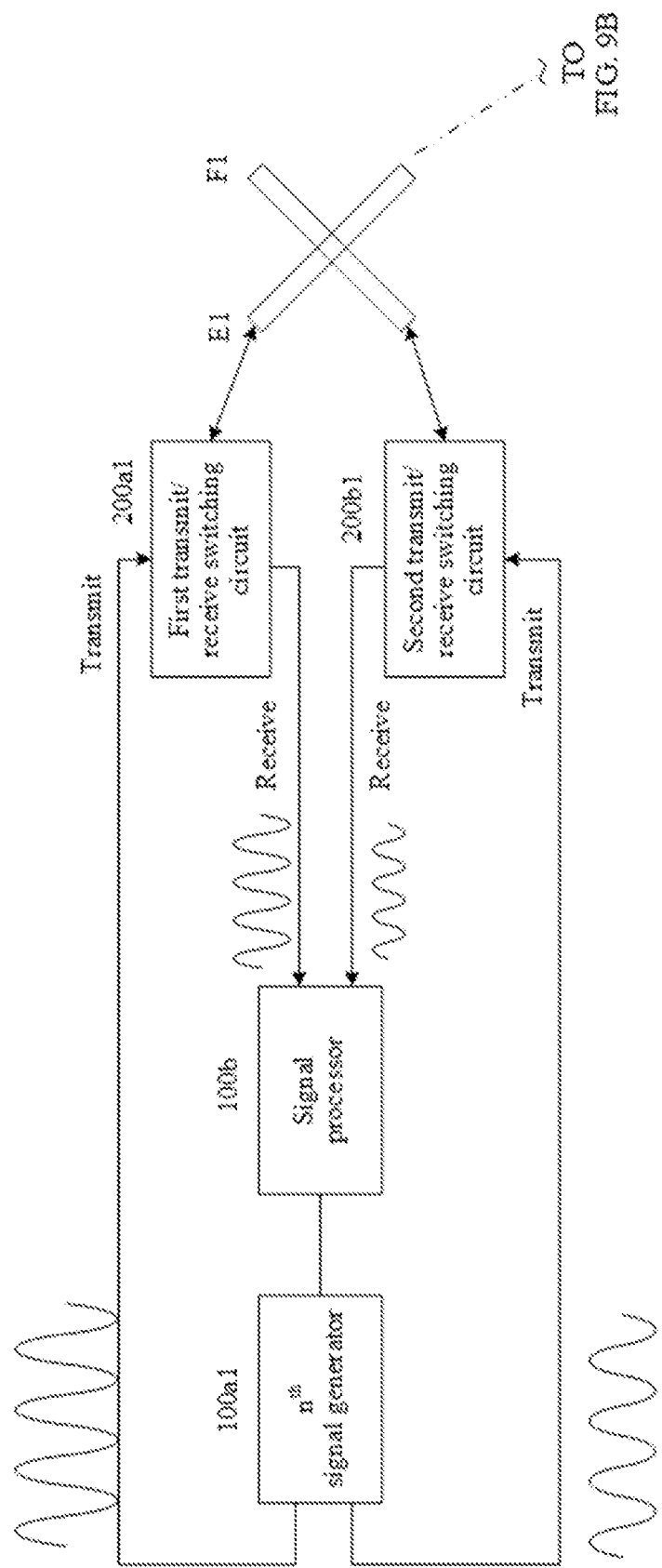
FIG. 9A to FIG. 9C are a schematic diagram of another wireless charging transmit end according to an embodiment of this application.
Figure 9B:
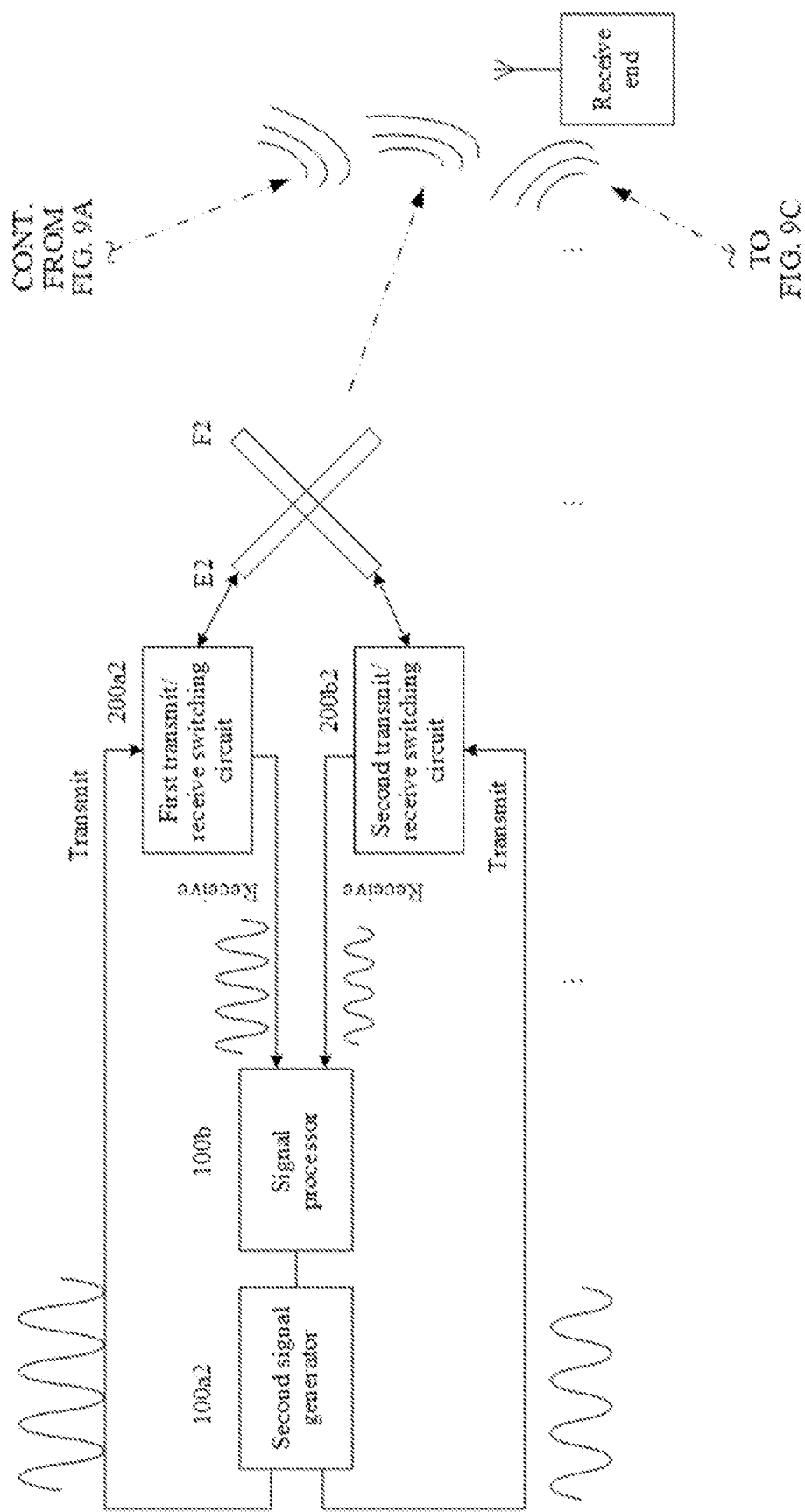
Figure 9C:
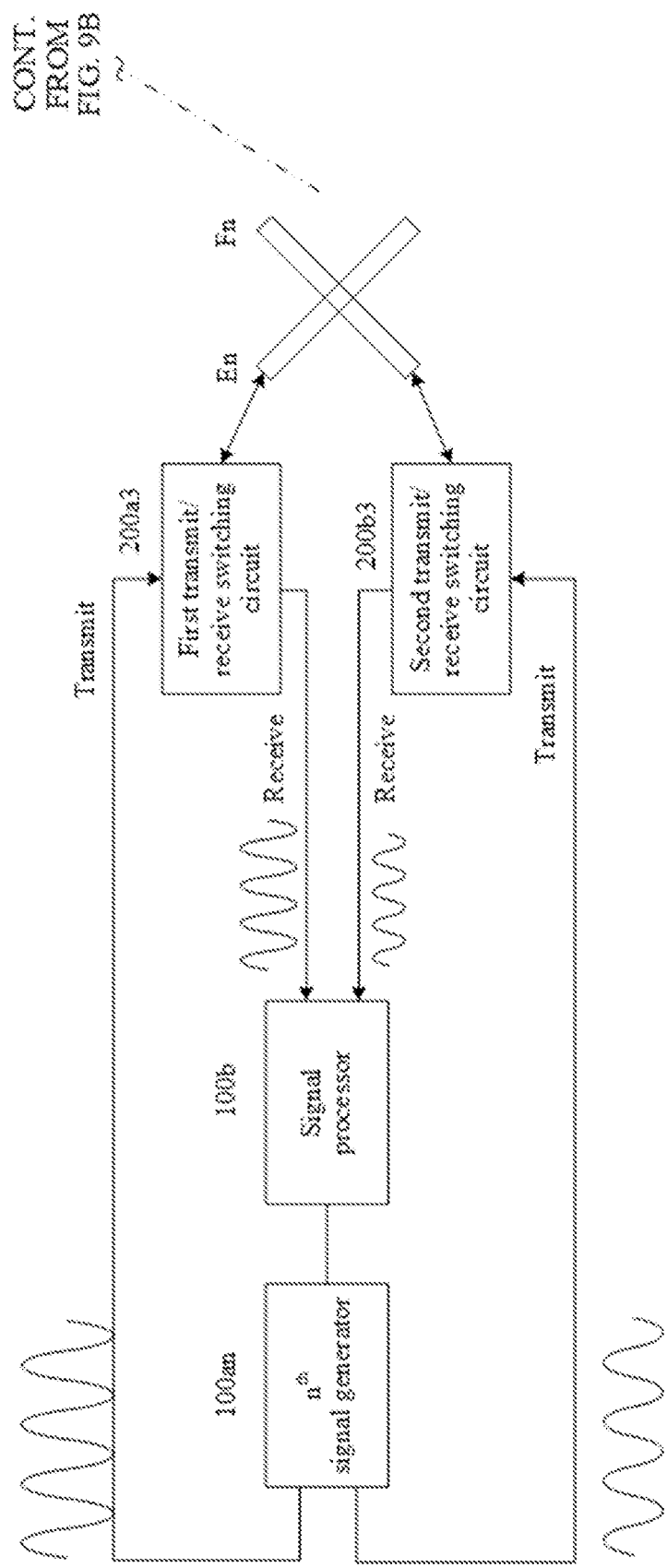

When the transmit end described in FIG. 8A to FIG. 8C includes a plurality of dual-polarized elements, the plurality of dual-polarized elements share no signal processor or signal generator. With reference to FIG. 9A to FIG. 9C, the following describes an implementation case in which a plurality of dual-polarized elements share a signal processor.

FIG. 9A to FIG. 9C are a schematic diagram of another wireless charging transmit end according to an embodiment of this application.

As can be learned by comparing FIG. 9A to FIG. 9C and FIG. 8A to FIG. 8C, a difference between FIG. 9A to FIG. 9C and FIG. 8A to FIG. 8C is that, in FIG. 9A to FIG. 9C, all dual-polarized elements share one signal processor 100b. Because the transmit end includes only one signal processor 100b, costs can be reduced and space can be saved in terms of hardware, and the transmit end has a relatively high integration degree, so that a volume of the transmit end is reduced.

Figure 10A:
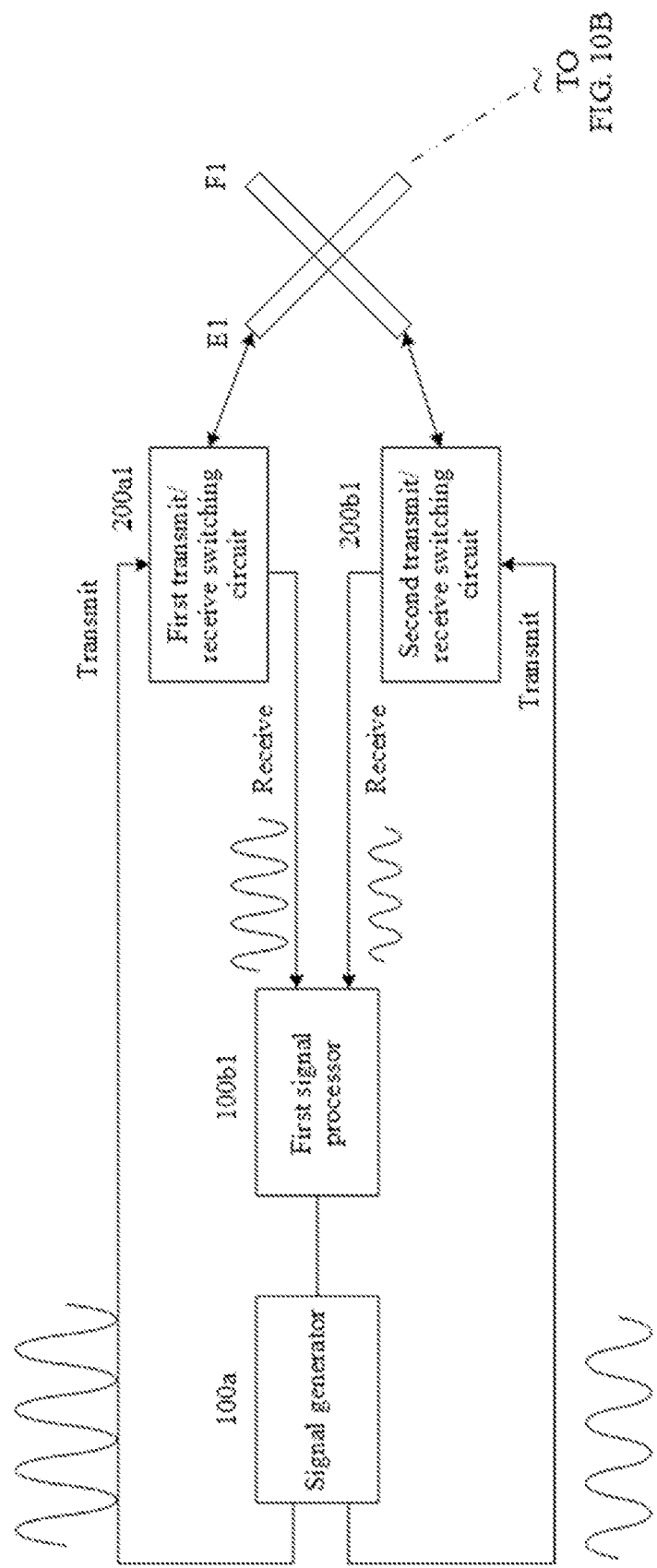
FIG. 10A to FIG. 10C are a schematic diagram of another wireless charging transmit end according to an embodiment of this application.
Figure 10B:
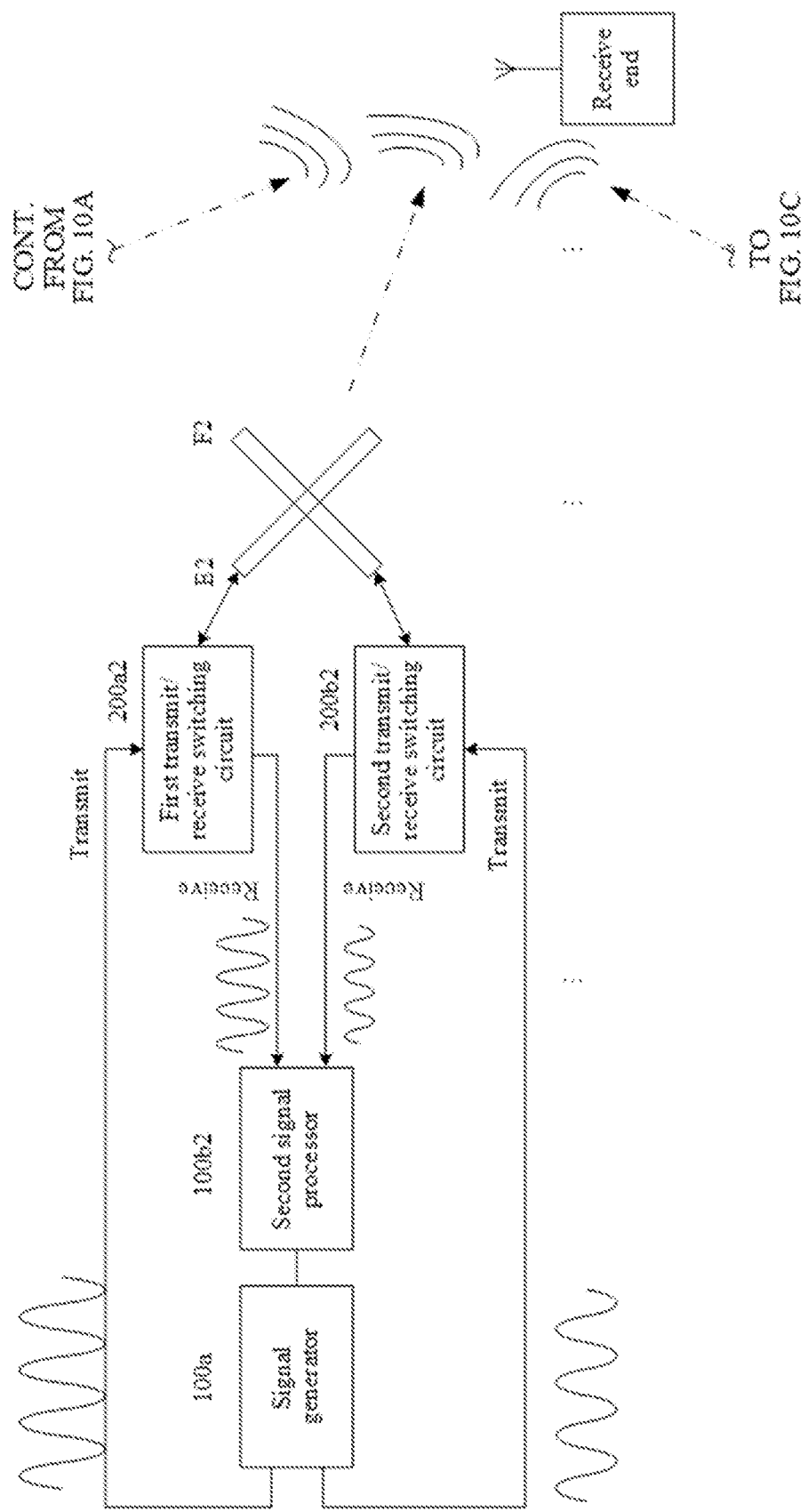
Figure 10C:
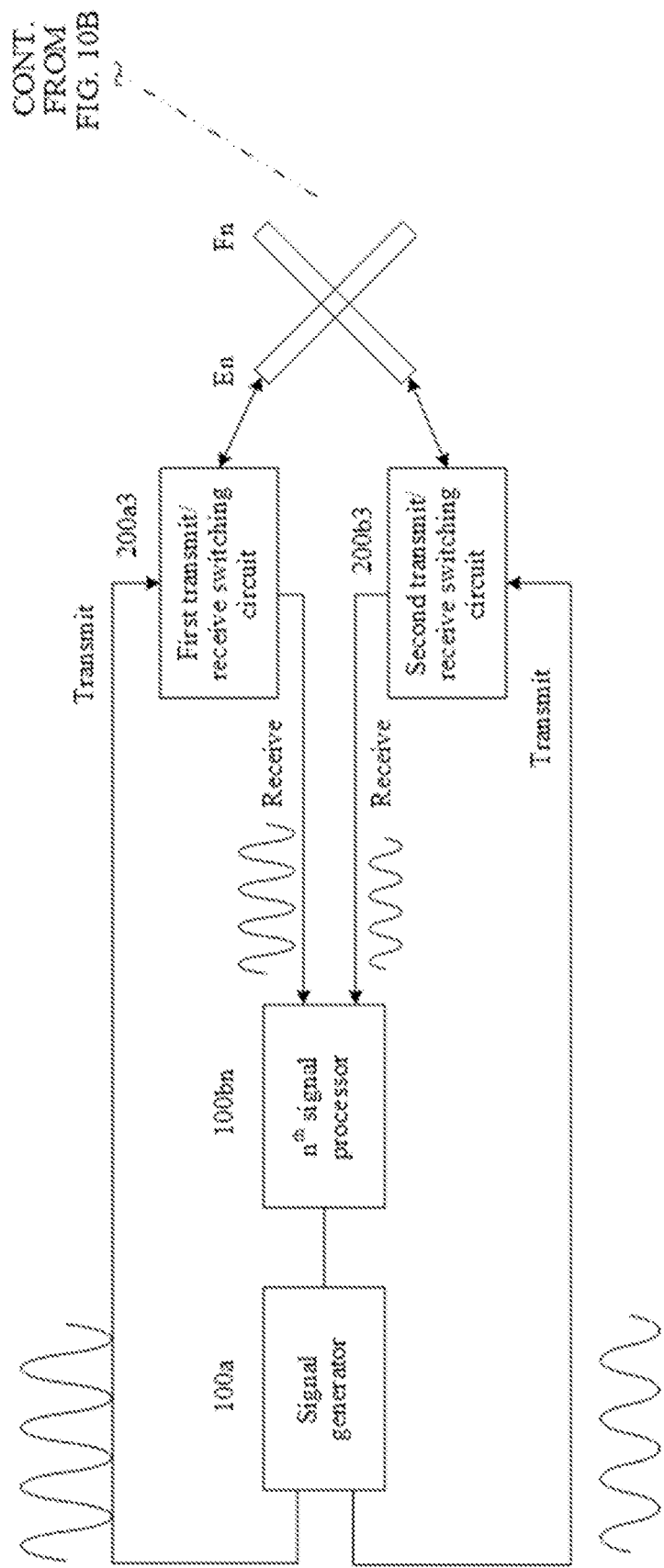

When the transmit end described in FIG. 9A to FIG. 9C includes a plurality of dual-polarized elements, all dual-polarized elements share the one signal processor 100b. With reference to FIG. 10A to FIG. 10C, the following describes an implementation in which all dual-polarized elements share one signal generator.

FIG. 10A to FIG. 10C are a schematic diagram of another wireless charging transmit end according to an embodiment of this application.

As can be learned by comparing FIG. 10A to FIG. 10C and FIG. 8A to FIG. 8C, a difference between FIG. 10A to FIG. 10C and FIG. 8A to FIG. 8C is that, in FIG. 10A to FIG. 10C, all dual-polarized elements share one signal generator 100a. Because the transmit end includes only one signal generator 100a, costs can be reduced and space can be saved in terms of hardware, and the transmit end has a relatively high integration degree, so that a volume of the transmit end is reduced.

Figures 1, 11A:
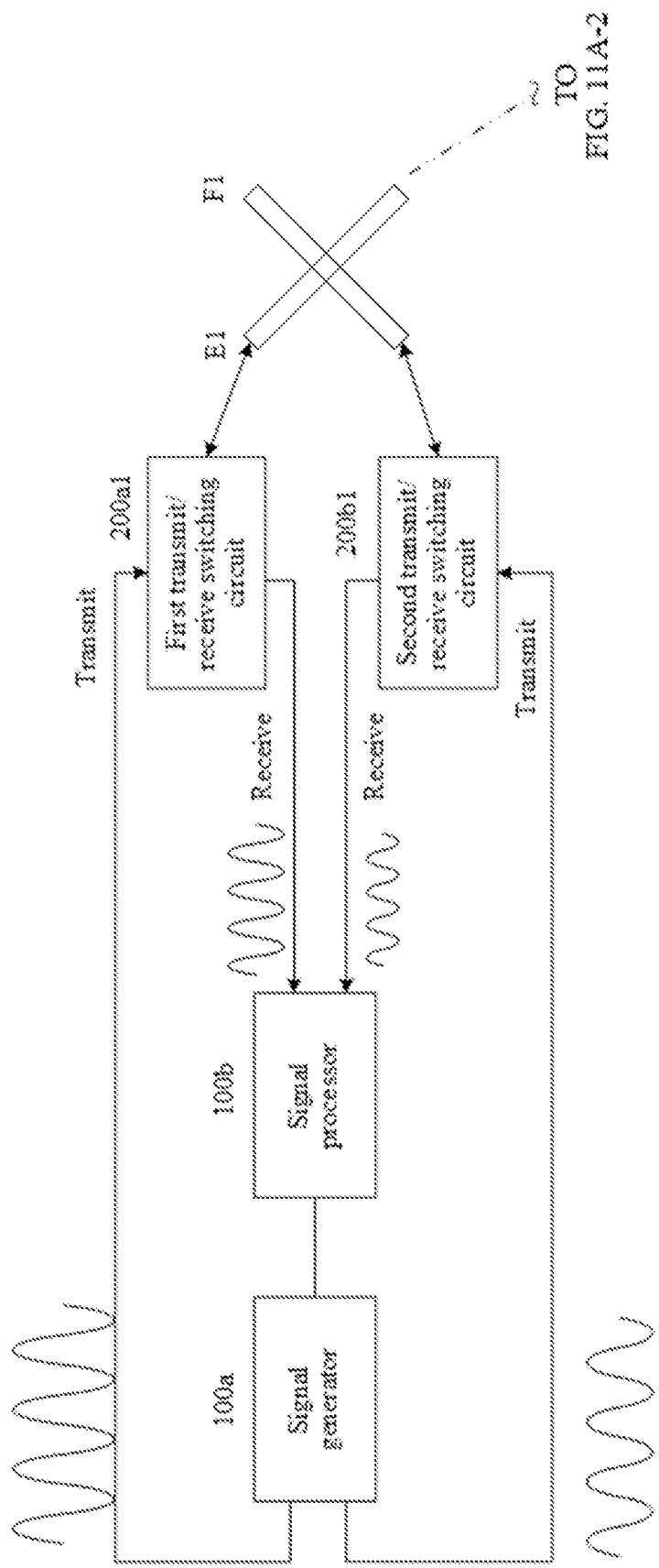
Figures 2, 11A:
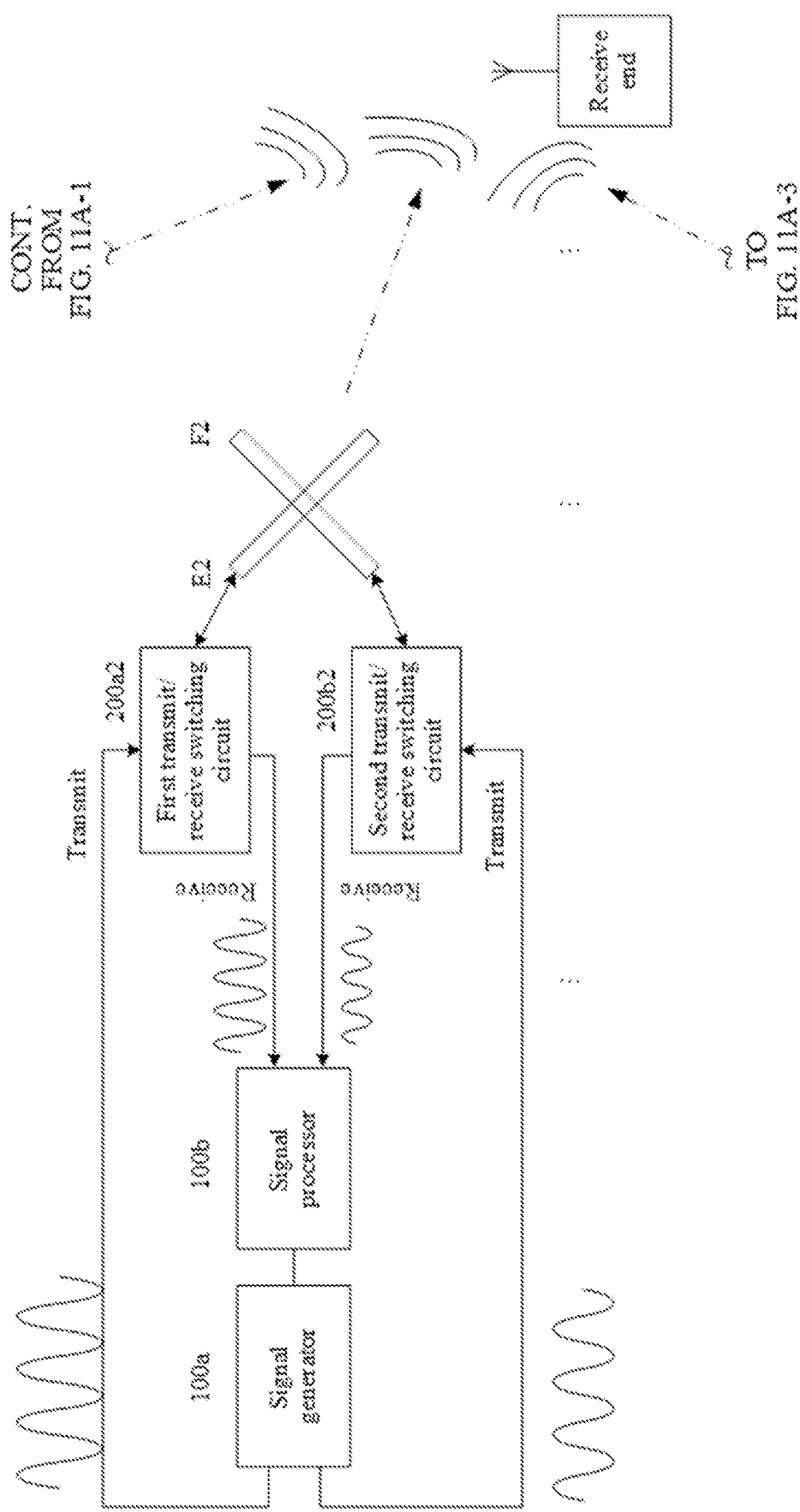
Figures 3, 11A:
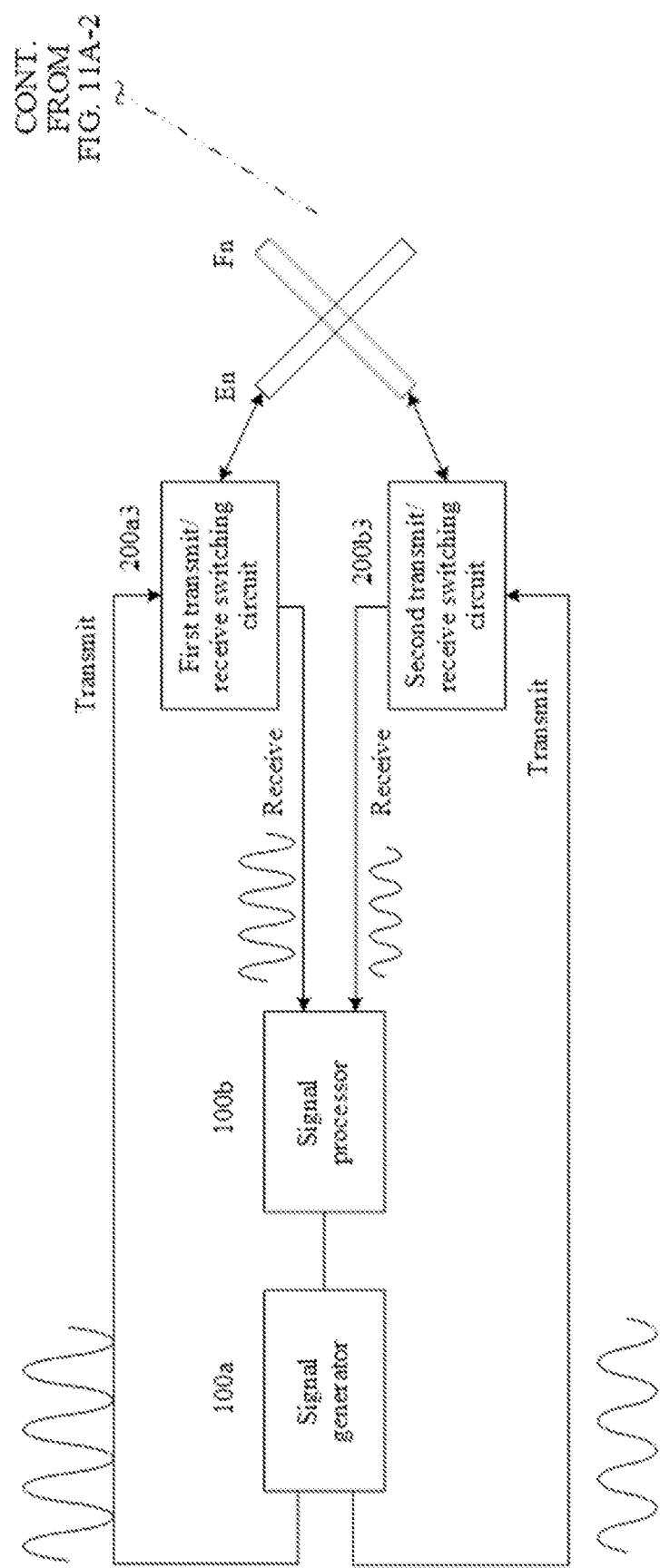
Figure 11B:
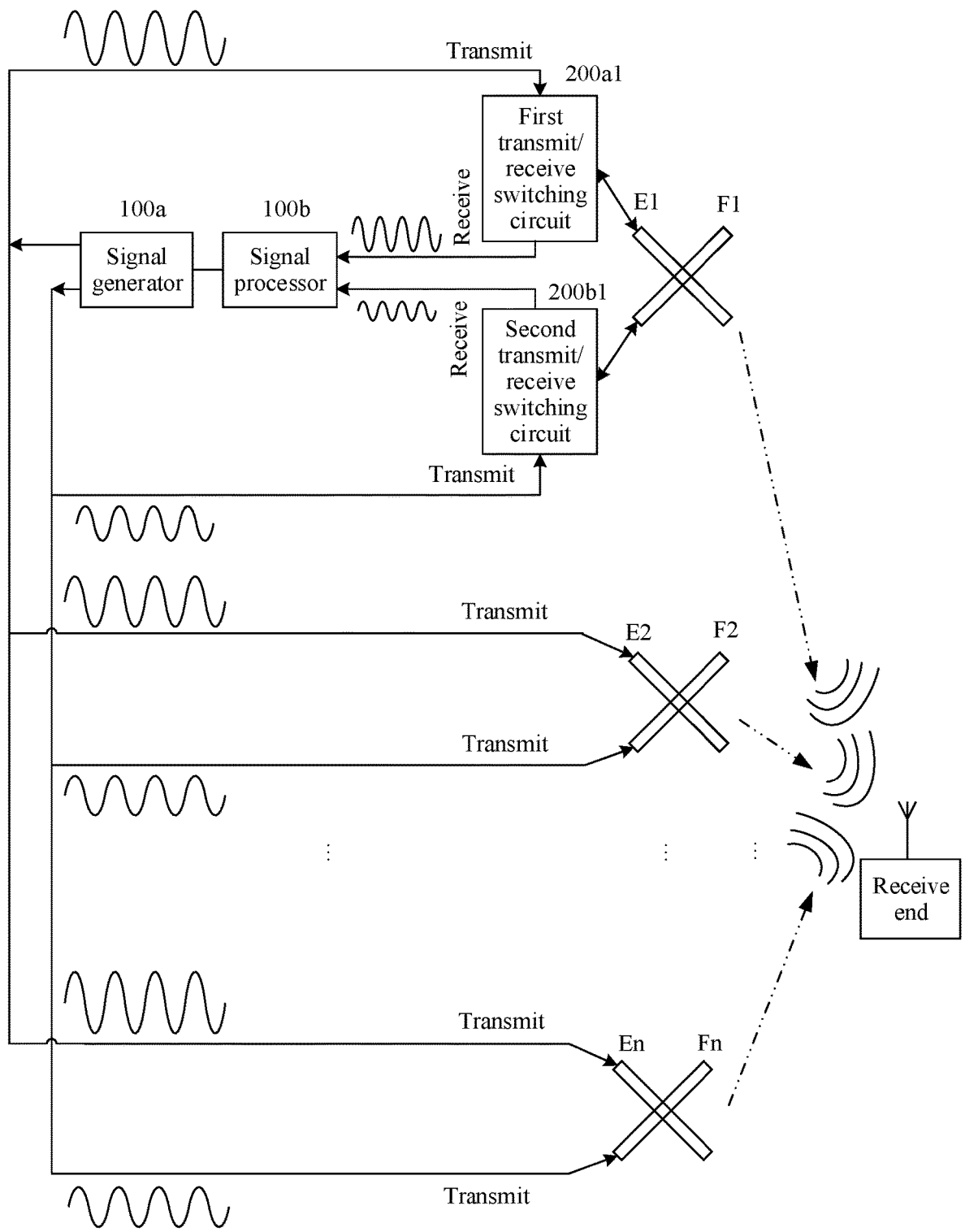
FIG. 11B is a schematic diagram of another wireless charging transmit end according to an embodiment of this application.

When the transmit end described in FIG. 10A to FIG. 10C includes a plurality of dual-polarized elements, all the dual-polarized elements share one signal generator 100a. With reference to FIG. 11A and FIG. 11B, the following describes an implementation in which all dual-polarized elements share both one signal generator and one signal processor.

FIG. 11A-1 to FIG. 11A-3 are a schematic diagram of another wireless charging transmit end according to an embodiment of this application.

As can be learned by comparing FIG. 11A-1 to FIG. 11A-3 and FIG. 8A to FIG. 8C, a difference between FIG. 11A-1 to FIG. 11A-3 and FIG. 8A to FIG. 8C is that, in FIG. 11A-1 to FIG. 11A-3, all dual-polarized elements share one signal generator 100a, and all the dual-polarized elements share one signal processor 100b. Because the transmit end includes only one signal generator 100a and one signal processor 100b, costs can be reduced and space can be saved in terms of hardware, and the transmit end has a relatively high integration degree, so that a volume of the transmit end is reduced.

In a possible implementation, when the wireless charging transmit end includes a plurality of dual-polarized elements, if all the dual-polarized elements are arranged in a completely consistent manner, only one signal processor may be used to process signals received by the dual-polarized elements, in other words, detect an amplitude ratio and a phase difference between signals. Similarly, all the dual-polarized elements may also use one signal generator. The following provides descriptions with reference to FIG. 11B.

FIG. 11B is a schematic diagram of another wireless charging transmit end according to an embodiment of this application.

As can be learned from FIG. 11B, n dual-polarized elements share one signal processor 100b and one signal generator 100a. However, FIG. 11B is different from FIG. 11A-1 to FIG. 11A-3. In FIG. 11A-1 to FIG. 11A-3, although a plurality of dual-polarized elements share a signal processor and a signal generator, the signal processor in FIG. 11A-1 to FIG. 11A-3 needs to process signals received by all the dual-polarized elements, and similarly, the signal generator in FIG. 11A-1 to FIG. 11A-3 needs to separately generate wireless signals that need to be transmitted by all the dual-polarized elements.

However, in FIG. 11B, because all dual-polarized elements are arranged in an identical manner, the signal processor 100b needs to process a signal received by only one dual-polarized element, in other words, the signal processor 100b can obtain, by analyzing a signal received by one dual-polarized element, amplitude ratios and phase differences corresponding to all the dual-polarized elements. In FIG. 11B, only an example in which a first receive/transmit switching circuit 200a1 and a second receive/transmit switching circuit 200b1 respectively corresponding to E1 and F1 in the first dual-polarized element are connected to the signal processor 100b is used for description. Other dual-polarized elements are not connected to the signal processor 100b. Because the other dual-polarized elements do not need to send signals to the signal processor 100b, receive/transmit switching circuits may be omitted, and only corresponding transmit circuits are directly connected to the signal generator. Therefore, hardware circuits can be reduced to some extent, and circuit implementation is simple.

The signal generator 100a respectively sends a generated first energy signal and a generated second energy signal to a first linearly polarized element and a second linearly polarized element in each of all the dual-polarized elements, in other words, first energy signals transmitted by all the dual-polarized elements are the same, and second energy signals transmitted by all the dual-polarized elements are also the same.

It should be understood that the plurality of first energy signals generated by the signal generator 100a may be independently generated, or may be generated by using a power splitter, and the same is true of the plurality of second energy signals.

It should be understood that when a dual-polarized antenna of the transmit end includes a plurality of dual-polarized elements, because each dual-polarized element includes two mutually orthogonal linearly polarized elements, each linearly polarized element can match a polarized antenna of a receive end. A higher polarization type matching degree between a polarized antenna of the transmit end and the polarized antenna of the receive end indicates higher wireless charging efficiency. Because the transmit end includes the plurality of dual-polarized elements, the plurality of dual-polarized elements may simultaneously transmit energy signals to the receive end, so that the transmit end can efficiently wirelessly charge the receive end.

In the foregoing embodiment, when the transmit end includes a plurality of dual-polarized elements, an arrangement manner of the plurality of dual-polarized elements is not limited to a specific array manner, and there may be various array manners such as a linear array, a rectangular array, or a circular array. In addition, for two independent linearly polarized elements in each element in the foregoing embodiment, polarization directions of all elements may also be diverse. For example, some elements are linearly polarized at 0 degrees/90 degrees, and the other elements are linearly polarized at ±45 degrees.

In addition, because the signal processor needs to obtain a phase difference and an amplitude ratio between a first wireless signal and a second wireless signal, to finally accurately obtain the phase difference and the amplitude ratio between the first wireless signal and the second wireless signal, a length of a cable between a first linearly polarized element and the signal processor is preferably equal to a length of a cable between a second linearly polarized element and the signal processor, in other words, corresponding radio frequency links are preferably designed with an equal length. If the cables have unequal lengths, signal attenuation is different, for example, a phase delay and insertion loss occur. When the radio frequency links have unequal lengths, corresponding compensation needs to be performed to minimize impact on the phase difference and the amplitude ratio that is caused by the radio frequency links.

Transmit End Method Embodiment

Based on the wireless charging transmit end provided in the foregoing embodiment, an embodiment of this application further provides a method for controlling a wireless charging transmit end. The following provides detailed descriptions with reference to the accompanying drawings.

Figure 12:
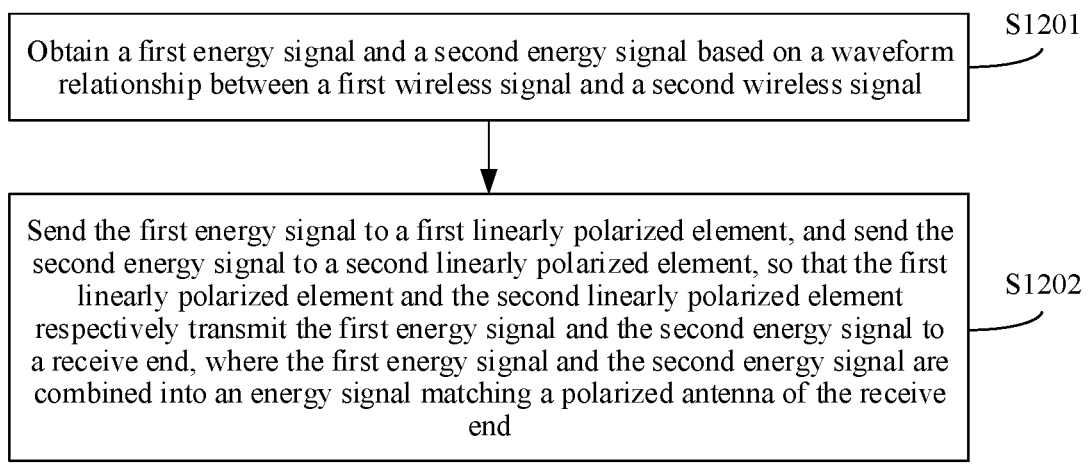
FIG. 12 is a flowchart of a method for controlling a wireless charging transmit end according to an embodiment of this application.

FIG. 12 is a flowchart of a method for controlling a wireless charging transmit end according to an embodiment of this application.

The method for controlling the wireless charging transmit end provided in this embodiment of this application is used to control the transmit end, so that the transmit end efficiently wirelessly charges a receive end. For a specific structure and an implementation of the transmit end, refer to the descriptions of the foregoing transmit end embodiment. Only brief descriptions are provided herein, and details are not described again.

The transmit end includes a signal processing apparatus and a dual-polarized antenna. The dual-polarized antenna includes at least one dual-polarized element. Each dual-polarized element includes a first linearly polarized element and a second linearly polarized element that are mutually orthogonal. The first linearly polarized element receives a first wireless signal from the receive end, and the second linearly polarized element receives a second wireless signal from the receive end.

The method for controlling the wireless charging transmit end provided in this embodiment of this application includes the following steps.

S1201: Obtain a first energy signal and a second energy signal based on a waveform relationship between the first wireless signal and the second wireless signal.

"Based on a waveform relationship between the first wireless signal and the second wireless signal" means focusing on a shape difference between the first wireless signal and the second wireless signal. Because the receive end transmits one signal, and the first linearly polarized element and the second linearly polarized element decompose the signal sent by the receive end into the first wireless signal and the second wireless signal, a type of a polarized antenna of the receive end may be learned based on the waveform relationship between the first wireless signal and the second wireless signal. A polarized signal matching the receive end, namely, polarization required by the receive end, may be obtained through inverse simulation based on the relationship between the first wireless signal and the second wireless signal, to generate, based on the waveform relationship between the first wireless signal and the second wireless signal, the first energy signal that needs to be transmitted by the first linearly polarized element and generate, based on the waveform relationship between the first wireless signal and the second wireless signal, the second energy signal that needs to be transmitted by the second linearly polarized element.

S1202: Send the first energy signal to the first linearly polarized element, and send the second energy signal to the second linearly polarized element, so that the first linearly polarized element and the second linearly polarized element respectively transmit the first energy signal and the second energy signal to the receive end, where the first energy signal and the second energy signal are combined into an energy signal matching the polarized antenna of the receive end.

The first energy signal and the second energy signal are combined into the energy signal matching the polarized antenna of the receive end. It should be understood that the receive end can receive both the first energy signal and the second energy signal. Because a relationship between the first energy signal and the second energy signal conforms to the polarization type of the polarized antenna of the receive end, when being transmitted in the air, the first energy signal and the second energy signal can be automatically combined into the energy signal required by the receive end.

According to the control method provided in this embodiment of this application, to improve efficiency of wirelessly charging the receive end by the transmit end, an antenna polarization type matching the receive end may be automatically implemented based on the antenna type of the receive end. The dual-polarized antenna of the transmit end includes two mutually orthogonal linearly polarized elements. The two mutually orthogonal linearly polarized elements may decompose the wireless signal sent by the receive end into the first wireless signal and the second wireless signal. Therefore, the waveform relationship between the first wireless signal and the second wireless signal can represent the type of the polarized antenna of the receive end. The transmit end generates the first energy signal and the second energy signal based on the waveform relationship between the first wireless signal and the second wireless signal. There is the same waveform relationship between the first energy signal and the second energy signal. Therefore, the energy signal obtained after the first energy signal and the second energy signal are transmitted and combined in the air can match the polarization type of the receive end, and can be efficiently received by the polarized antenna of the receive end, so that efficiency of wirelessly charging the receive end by the transmit end is improved.

In a possible implementation, the obtaining a first energy signal and a second energy signal based on a waveform relationship between the first wireless signal and the second wireless signal specifically includes:

obtaining a phase difference between the first wireless signal and the second wireless signal and an amplitude ratio between the first wireless signal and the second wireless signal, and generating the first energy signal and the second energy signal based on the phase difference and the amplitude ratio. The phase difference and the amplitude ratio exist between the first energy signal and the second energy signal.

The obtaining a first energy signal and a second energy signal based on a waveform relationship between the first wireless signal and the second wireless signal specifically includes:

obtaining the phase difference based on a phase of the first wireless signal and a phase of the second wireless signal, and obtaining the amplitude ratio based on amplitude of the first wireless signal and amplitude of the second wireless signal; and generating the first energy signal and the second energy signal based on the phase difference and the amplitude ratio. The phase difference and the amplitude ratio exist between the first energy signal and the second energy signal. The amplitude ratio may represent shapes of the first wireless signal and the second wireless signal, namely, strength of the wireless signals, so that shapes of the first energy signal and the second energy signal can be simulated based on the amplitude ratio.

For example, if a phase difference between the first wireless signal and the second wireless signal is a first phase difference, and a phase difference between the first energy signal and the second energy signal is a second phase difference, the second phase difference is equal to the first phase difference, in other words, the phase differences are equal. If an amplitude ratio between the first wireless signal and the second wireless signal is a first amplitude ratio, and an amplitude ratio between the first energy signal and the second energy signal is a second amplitude ratio, the second amplitude ratio is equal to the first amplitude ratio, in other words, the amplitude ratios are equal. It should be understood that "equal" may mean "completely equal" or may mean that there is a specific error. When "equal" means "completely equal", a matching effect between an antenna of the transmit end and the antenna of the receive end is the highest, and wireless charging efficiency is the highest. For example, when the phase differences are not completely equal and there is a specific error, the matching effect between the antenna of the transmit end and the antenna of the receive end is slightly poor. In this embodiment of this application, the first phase difference is not necessarily completely equal to the second phase difference, provided that a difference between the first phase difference and the second phase difference falls within a preset range, in other words, the first phase difference and the second phase difference are consistent.

System Embodiment

Based on methods for controlling the wireless charging transmit end and the transmit end that are provided in the foregoing embodiments, this application further provides a wireless charging system. The following provides detailed descriptions with reference to the accompanying drawings.

Figure 13:
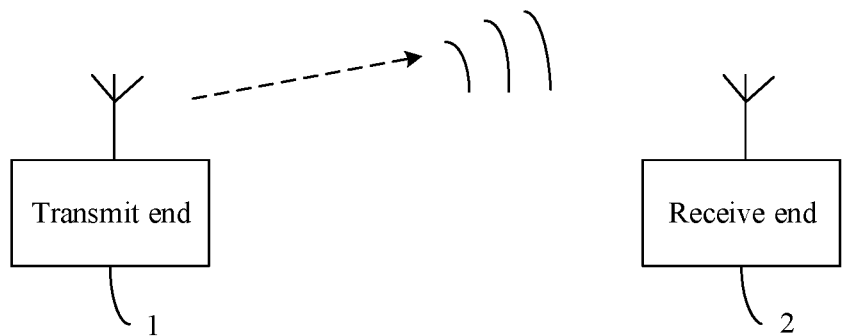
FIG. 13 is a schematic diagram of another wireless charging system according to an embodiment of this application.

FIG. 13 is a schematic diagram of another wireless charging system according to an embodiment of this application.

The wireless charging system provided in this embodiment of this application includes a receive end 2 and the transmit end 1 described in the foregoing embodiment.

The transmit end 1 is configured to transmit an energy signal to the receive end 2 by using a dual-polarized antenna, to wirelessly charge the receive end 2.

The transmit end 1 in the wireless charging system provided in this embodiment of this application may automatically match a polarization type of an antenna of the receive end 2. Therefore, efficiency of wirelessly charging the receive end 2 can be improved. A dual-polarized antenna of the transmit end includes two mutually orthogonal linearly polarized elements. The two mutually orthogonal linearly polarized elements may decompose a wireless signal sent by the receive end into a first wireless signal and a second wireless signal. Therefore, a relationship between the first wireless signal and the second wireless signal can represent the type of the polarized antenna of the receive end. The transmit end generates a first energy signal and a second energy signal based on the waveform relationship between the first wireless signal and the second wireless signal. There is the same waveform relationship between the first energy signal and the second energy signal. Therefore, an energy signal obtained after the first energy signal and the second energy signal are transmitted and combined in the air can match the polarization type of the receive end, and can be efficiently received by the polarized antenna of the receive end, so that efficiency of wirelessly charging the receive end by the transmit end is improved.

FIG. 13 shows only a scenario in which one transmit end wirelessly charges one receive end. The transmit end in the wireless charging system provided in this embodiment of this application may also wirelessly charge a plurality of receive ends. A quantity of receive ends corresponding to one transmit end is not specifically limited in this embodiment of this application. One transmit end may correspond to one or more receive ends.

The following uses an example in which one transmit end can wirelessly charge a plurality of receive ends below.

Figure 14:
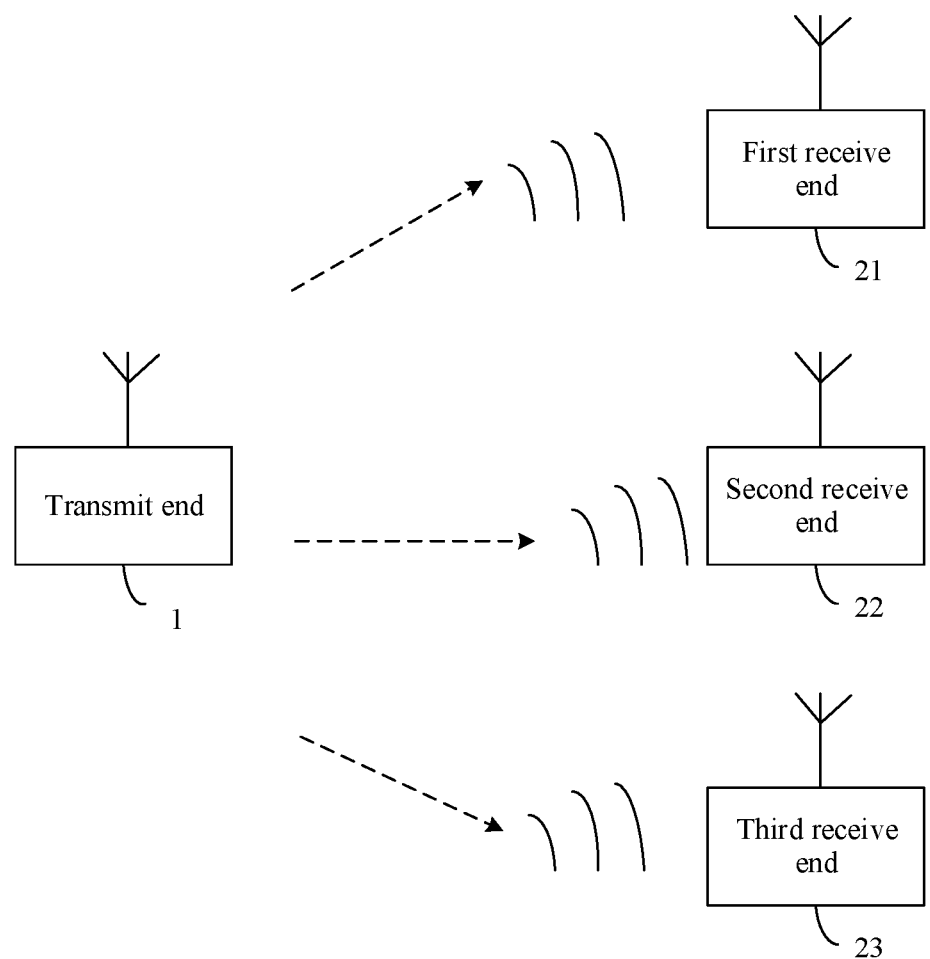
FIG. 14 is a schematic diagram of another wireless charging system according to an embodiment of this application.

FIG. 14 is a schematic diagram of another wireless charging system according to an embodiment of this application.

The wireless charging system provided in this embodiment of this application may include a plurality of receive ends. In FIG. 14, an example in which one transmit end 1 corresponds to three receive ends is used for description. The three receive ends are a first receive end 21, a second receive end 22, and a third receive end 23. It should be understood that the transmit end 1 may alternatively correspond to more receive ends.

In a possible implementation, the transmit end 1 includes a dual-polarized antenna, the dual-polarized antenna includes at least one dual-polarized element, and each dual-polarized element includes two mutually orthogonal linearly polarized elements.

The transmit end 1 is configured to separately wirelessly charge the plurality of receive ends by using the dual-polarized antenna. For example, the transmit end 1 may charge different receive ends through time division multiplexing. For example, the transmit end 1 wirelessly charges the first receive end 21 in a first time period, and in this case, polarization type matching is performed between the dual-polarized antenna of the transmit end 1 and a polarized antenna of the first receive end 21. By analogy, the transmit end 1 wirelessly charges the second receive end 22 in a second time period, and in this case, polarization type matching is performed between the dual-polarized antenna of the transmit end 1 and a polarized antenna of the second receive end 22. The transmit end 1 wirelessly charges the third receive end 23 in a third time period, and in this case, polarization type matching is performed between the dual-polarized antenna of the transmit end 1 and a polarized antenna of the third receive end 23.

Because in the wireless charging system provided in this embodiment of this application, a polarization type of the antenna of the transmit end 1 is consistent with the polarization type of the antenna of the receive end, efficiency of wirelessly charging the receive end by the transmit end 1 can be improved.

It should be understood that, in this application, "at least one" means one or more, and "a plurality of" means two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "|" generally indicates an "or" relationship between the associated objects. "At least one of the following" or similar expressions indicate any combination of the following, including one or any combination of two or more of the following. For example, at least one of a, b, or c may indicate: a, b, c, "a and b", "a and c", "b and c", or "a, b and c", where there may one or more a-s, one or more b-s, and one or more c-s.

The foregoing descriptions are merely example embodiments of this application, and are not intended to limit this application in any form. Although the example embodiments of this application are disclosed above, the embodiments are not intended to limit this application. It will be appreciated that a person of ordinary skill in the art can make changes and modifications to technical solutions of this application without departing from the protection scope of the technical solutions of this application. Therefore, amendments, equivalent variations, and modifications made relative to the above embodiments may fall within the protection scope of this application.

What is claimed is:

1. A wireless charging transmit end for wirelessly charging a receive end, comprising:

a signal processing apparatus; and
a dual-polarized antenna, wherein the dual-polarized antenna comprises at least one dual-polarized element;
wherein each dual-polarized element of the at least one dual-polarized element comprises a first linearly polarized element and a second linearly polarized element that are mutually orthogonal, wherein the first linearly polarized element is configured to receive a first wireless signal from the receive end, and wherein the second linearly polarized element is configured to receive a second wireless signal from the receive end;
wherein the signal processing apparatus is configured to:
obtain a first energy signal and a second energy signal based on a waveform relationship between the first wireless signal and the second wireless signal;
send the first energy signal to the first linearly polarized element; and
send the second energy signal to the second linearly polarized element;
wherein the first linearly polarized element is configured to transmit the first energy signal to the receive end and the second linearly polarized element is configured to transmit the second energy signal to the receive end such that the first energy signal and the second energy signal combine into an energy signal matching a polarized antenna of the receive end.

2. The transmit end according to claim 1, wherein the signal processing apparatus is further configured to:
obtain a phase difference between the first wireless signal and the second wireless signal;
obtain an amplitude ratio between the first wireless signal and the second wireless signal; and
obtain the first energy signal and the second energy signal based on the phase difference and the amplitude ratio.

3. The transmit end according to claim 2, wherein the signal processing apparatus comprises:
a signal processor; and
a signal generator;
wherein the signal processor is configured to:
receive the first wireless signal and the second wireless signal;
obtain the phase difference based on a phase of the first wireless signal and a phase of the second wireless signal; and
obtain the amplitude ratio based on amplitude of the first wireless signal and amplitude of the second wireless signal; and
wherein the signal generator is configured to:
receive the phase difference and the amplitude ratio from the signal processor;
generate the first energy signal and the second energy signal based on the phase difference and the amplitude ratio; and
send the first energy signal to the first linearly polarized element, and send the second energy signal to the second linearly polarized element.

4. The transmit end according to claim 3, further comprising:
a first receive/transmit switching circuit; and
a second receive/transmit switching circuit;
wherein a first end of the first receive/transmit switching circuit is connected to the first linearly polarized element, a second end of the first receive/transmit switching circuit is connected to the signal generator, and a third end of the first receive/transmit switching circuit is connected to the signal processor;
wherein a first end of the second receive/transmit switching circuit is connected to the second linearly polarized element, a second end of the second receive/transmit switching circuit is connected to the signal generator, and a third end of the second receive/transmit switching circuit is connected to the signal processor;
wherein while the transmit end is in a receiving state: the first receive/transmit switching circuit is configured to perform switching to connect the first linearly polarized element and the signal processor, and the second receive/transmit switching circuit is configured to perform switching to connect the second linearly polarized element and the signal processor; and
wherein while the transmit end is in a transmitting state: the first receive/transmit switching circuit is configured to perform switching to connect the first linearly polarized element and the signal generator, and the second receive/transmit switching circuit is configured to perform switching to connect the second linearly polarized element and the signal generator.

5. The transmit end according to claim 3, wherein the dual-polarized antenna comprises a plurality of dual-polarized elements, wherein the plurality of dual-polarized elements are all configured to send energy signals matching the polarized antenna of the receive end to the receive end.

6. The transmit end according to claim 5, wherein the signal processing apparatus comprises one signal processor, and the plurality of dual-polarized elements share the one signal processor; or
wherein the signal processing apparatus comprises a plurality of signal processors, and the plurality of dual-polarized elements are in a one-to-one correspondence with the plurality of signal processors.

7. The transmit end according to claim 5, wherein the signal processing apparatus comprises a plurality of signal generators, and the plurality of dual-polarized elements are in a one-to-one correspondence with the plurality of signal generators.

8. The transmit end according to claim 5, wherein the signal processing apparatus comprises one signal generator, and the plurality of dual-polarized elements share the one signal generator.

9. The transmit end according to claim 5, further comprising:
a plurality of first receive/transmit switching circuits; and
a plurality of second receive/transmit switching circuits;
wherein the plurality of dual-polarized elements are in a one-to-one correspondence with the plurality of first receive/transmit switching circuits, and the plurality of dual-polarized elements are in a one-to-one correspondence with the plurality of second receive/transmit switching circuits.

10. A method for controlling a transmit end for wireless charging, comprising:
receiving, by a dual-polarized antenna of a transmit end, a first wireless signal from a receive end via a first linearly polarized element and a second wireless signal from the receive end via a second linearly polarized element, wherein the first linearly polarized element and the second linearly polarized element are mutually orthogonal;
obtaining, by a signal processing apparatus of the transmit end, a first energy signal and a second energy signal based on a waveform relationship between the first wireless signal and the second wireless signal; and
transmitting, via the first and second linearly polarized elements, the first energy signal and the second energy signal to the receive end such that the first energy signal and the second energy signal combine into an energy signal matching a polarized antenna of the receive end.

11. The method according to claim 10, wherein obtaining the first energy signal and the second energy signal comprises:
   obtaining a phase difference between the first wireless signal and the second wireless signal and an amplitude ratio between the first wireless signal and the second wireless signal; and
   obtaining the first energy signal and the second energy signal based on the phase difference and the amplitude ratio.

12. The method according to claim 11, wherein obtaining the phase difference is based on a phase of the first wireless signal and a phase of the second wireless signal, and obtaining the amplitude ratio is based on an amplitude of the first wireless signal and an amplitude of the second wireless signal.

13. A wireless charging system, comprising:
   a receive end; and
   a transmit end, wherein the transmit end comprises a signal processing apparatus and a dual-polarized antenna, wherein the dual-polarized antenna comprises at least one dual-polarized element;
   wherein each dual-polarized element of the at least one dual-polarized element comprises a first linearly polarized element and a second linearly polarized element that are mutually orthogonal, wherein the first linearly polarized element is configured to receive a first wireless signal from the receive end, and wherein the second linearly polarized element is configured to receive a second wireless signal from the receive end;
   wherein the signal processing apparatus is configured to:
      obtain a first energy signal and a second energy signal based on a waveform relationship between the first wireless signal and the second wireless signal;
      send the first energy signal to the first linearly polarized element; and
      send the second energy signal to the second linearly polarized element;
   wherein the first linearly polarized element is configured to transmit the first energy signal to the receive end and the second linearly polarized element is configured to transmit the second energy signal to the receive end such that the first energy signal and the second energy signal combine into an energy signal matching a polarized antenna of the receive end.

14. The system according to claim 13, wherein the system comprises a plurality of receive ends; and
   wherein the transmit end is configured to separately wirelessly charge the plurality of receive ends by using the dual-polarized antenna.

15. The system according to claim 13, wherein the signal processing apparatus is further configured to:
   obtain a phase difference between the first wireless signal and the second wireless signal;
   obtain an amplitude ratio between the first wireless signal and the second wireless signal; and
   generate the first energy signal and the second energy signal based on the phase difference and the amplitude ratio.

16. The system according to claim 15, wherein the signal processing apparatus comprises:
   a signal processor; and
   a signal generator;
   wherein the signal processor is configured to:
      receive the first wireless signal and the second wireless signal;
      obtain the phase difference based on a phase of the first wireless signal and a phase of the second wireless signal; and
      obtain the amplitude ratio based on amplitude of the first wireless signal and amplitude of the second wireless signal; and
   wherein the signal generator is configured to:
      receive the phase difference and the amplitude ratio from the signal processor;
      generate the first energy signal and the second energy signal based on the phase difference and the amplitude ratio; and
      send the first energy signal to the first linearly polarized element, and send the second energy signal to the second linearly polarized element.

17. The system according to claim 16, wherein the transmit end further comprises:
   a first receive/transmit switching circuit; and
   a second receive/transmit switching circuit;
   wherein a first end of the first receive/transmit switching circuit is connected to the first linearly polarized element, a second end of the first receive/transmit switching circuit is connected to the signal generator, and a third end of the first receive/transmit switching circuit is connected to the signal processor;
   wherein a first end of the second receive/transmit switching circuit is connected to the second linearly polarized element, a second end of the second receive/transmit switching circuit is connected to the signal generator, and a third end of the second receive/transmit switching circuit is connected to the signal processor;
   wherein while the transmit end is in a receiving state: the first receive/transmit switching circuit is configured to perform switching to connect the first linearly polarized element and the signal processor, and the second receive/transmit switching circuit is configured to perform switching to connect the second linearly polarized element and the signal processor; and
   wherein while the transmit end is in a transmitting state: the first receive/transmit switching circuit is configured to perform switching to connect the first linearly polarized element and the signal generator, and the second receive/transmit switching circuit is configured to perform switching to connect the second linearly polarized element and the signal generator.

18. The system according to claim 16, wherein the dual-polarized antenna comprises a plurality of dual-polarized elements, wherein the plurality of dual-polarized elements are all configured to send energy signals matching the polarized antenna of the receive end to the receive end.

19. The system according to claim 18, wherein the signal processing apparatus comprises one signal processor, and the plurality of dual-polarized elements share the one signal processor; or
   wherein the signal processing apparatus comprises a plurality of signal processors, and the plurality of dual-polarized elements are in a one-to-one correspondence with the plurality of signal processors.

20. The system according to claim 18, wherein the signal processing apparatus comprises a plurality of signal generators, and the plurality of dual-polarized elements are in a one-to-one correspondence with the plurality of signal generators.

* * * * *